United States Patent
Jiang et al.

(10) Patent No.: US 11,258,880 B2
(45) Date of Patent: Feb. 22, 2022

(54) WEARABLE DEVICE FOR CONTROLLING ENDPOINT DEVICES

(71) Applicant: Amazon Technologies, Inc., Seattle, WA (US)

(72) Inventors: Tao Jiang, Milpitas, CA (US); Hans Edward Birch-Jensen, Sunnyvale, CA (US)

(73) Assignee: Amazon Technologies, Inc., Seattle, WA (US)

(*) Notice: Subject to any disclaimer, the term of this patent is extended or adjusted under 35 U.S.C. 154(b) by 143 days.

(21) Appl. No.: 16/450,180

(22) Filed: Jun. 24, 2019

(65) Prior Publication Data

US 2020/0404077 A1    Dec. 24, 2020

(51) Int. Cl.

| | |
|---|---|
| H04L 29/08 | (2006.01) |
| H04L 67/00 | (2022.01) |
| H04B 17/318 | (2015.01) |
| H04W 4/38 | (2018.01) |
| G06F 16/9035 | (2019.01) |
| G06N 20/00 | (2019.01) |
| H04W 12/63 | (2021.01) |

(Continued)

(52) U.S. Cl.
CPC .............. *H04L 67/34* (2013.01); *G06F 1/163* (2013.01); *G06F 3/017* (2013.01); *G06F 16/9035* (2019.01); *G06K 9/00335* (2013.01); *G06N 20/00* (2019.01); *H04B 17/318* (2015.01); *H04W 4/38* (2018.02); *H04W 12/63* (2021.01); *H04W 12/68* (2021.01)

(58) Field of Classification Search
CPC ........ H04L 67/34; H04B 17/318; H04W 4/38; H04W 12/63; H04W 12/68; G06F 16/9035; G06F 1/163; G06F 3/017; G06N 20/00; G06K 9/00335
See application file for complete search history.

(56) References Cited

U.S. PATENT DOCUMENTS 9,793,981 B2 * 10/2017 Lee .................... G06F 3/017
10,484,673 B2 * 11/2019 Jin ..................... H04N 13/211

(Continued)

FOREIGN PATENT DOCUMENTS

WO    2018228883 A1    12/2018

OTHER PUBLICATIONS

International Search Report and Written Opinion on application No. PCT/US2020/038756, dated Sep. 2, 2020.

*Primary Examiner* — Marcos L Torres
(74) *Attorney, Agent, or Firm* — Lowenstein Sandler LLP

(57) ABSTRACT

Technologies for a wearable device are described. One wearable device includes a radio and a processor, the processor measures sensor data (e.g., a first angle between the wearable device and a first wireless endpoint device and a second angle between the wearable device and a second wireless endpoint device) and motion data indicative of motion of the wearable device over a first duration of time. The wearable device also measure signal strength values for communications with the respective devices. The wearable device predicts, using a first trained model, a position of the wearable device and to which target device the wearable device is directed. The wearable device predicts, using a second trained mode, a gesture made by the wearable device. The wearable device sends a message, corresponding to the gesture, to the target device to control the target device.

19 Claims, 12 Drawing Sheets

(51) Int. Cl.
*G06F 1/16* (2006.01)
*G06F 3/01* (2006.01)
*G06K 9/00* (2022.01)
*H04W 12/68* (2021.01)

(56) References Cited

U.S. PATENT DOCUMENTS

| | | | |
|---|---|---|---|
| 2009/0265470 A1* | 10/2009 | Shen | G06F 3/017 709/227 |
| 2015/0215443 A1* | 7/2015 | Heo | H04M 1/05 455/556.1 |
| 2017/0083101 A1 | 3/2017 | Dow et al. | |

* cited by examiner

WEARABLE DEVICE FOR CONTROLLING ENDPOINT DEVICES

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
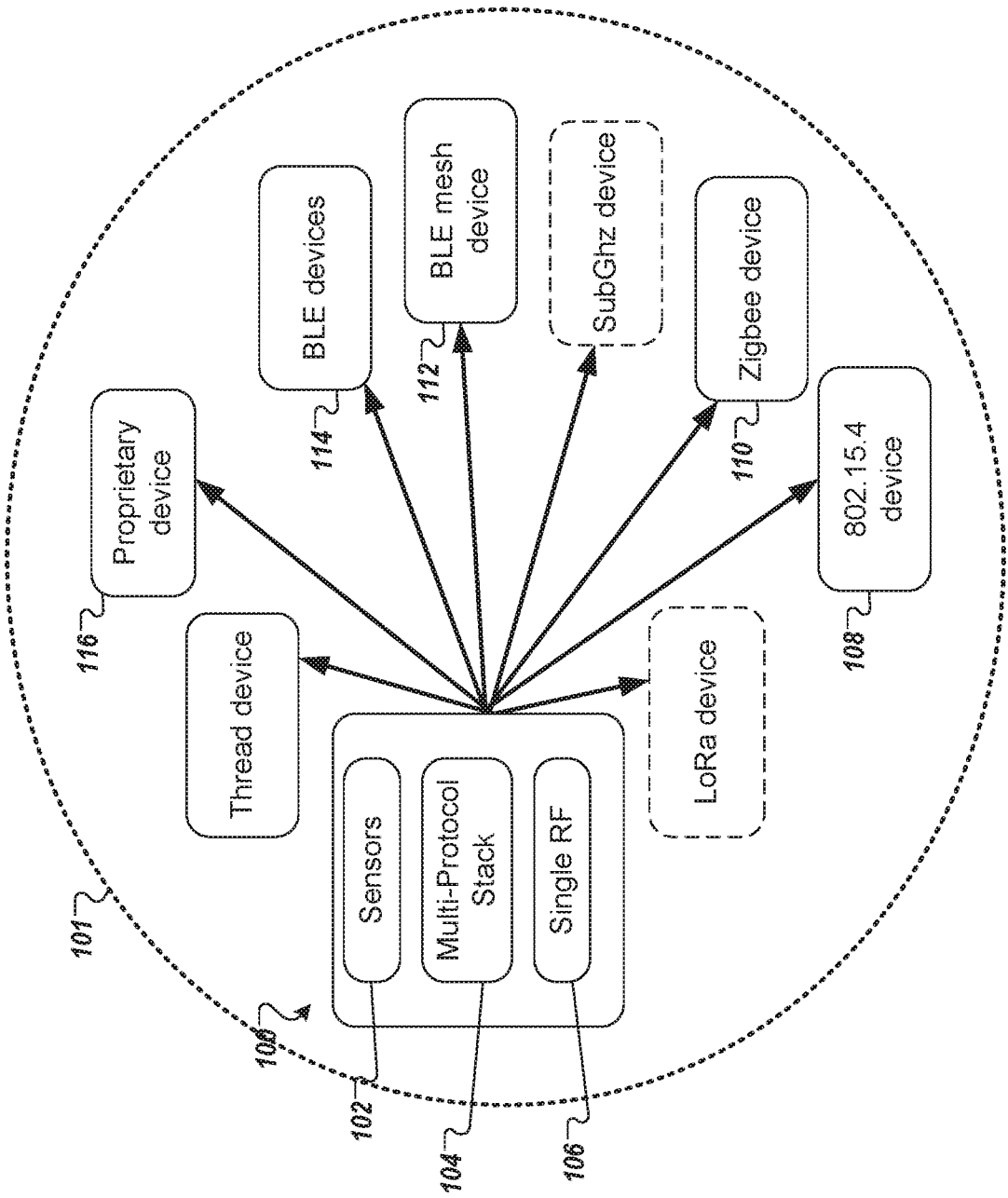
FIG. 1 is a block diagram of a wearable device in an environment in which multiple nearby endpoint devices are discovered by the wearable device for controlling operations of the nearby endpoint device according to one embodiment.

Technologies for a wearable device are described. One wearable device includes a radio and a processor, the processor measures sensor data (e.g., a first angle between the wearable device and a first wireless endpoint device and a second angle between the wearable device and a second wireless endpoint device) and motion data indicative of motion of the wearable device over a first duration of time. The wearable device also measure signal strength values for communications with the respective devices. The wearable device predicts, using a first trained model, a position of the wearable device and to which target device the wearable device is directed. The wearable device predicts, using a second trained mode, a gesture made by the wearable device. The wearable device sends a command or message, corresponding to the gesture, to the target device to control the target device. In some cases, the wearable device has a single radio that can control devices operating on various frequencies and communicating with various radio technologies, such as with wireless endpoint devices that operate with Bluetooth® Low Energy (BLE) technology, BLE mesh technology, Zigbee® technology, IEEE 802.15.4, or other proprietary protocols. The wearable device can automatically detect surrounding wireless endpoint devices within a range and can, based on a user gesture, control those devices, even when the wearable device is not connected with these devices on a home network previously. The embodiments described herein allow a user to approach any type of device and control it right away. As noted, the endpoint devices can be on different mesh networks and use different mesh technologies. In some embodiments, the wearable device can use an access point (AP) device, such a voice-controlled device that is connected to a home network, to easily provision the endpoint devices for gesture recognition and control by the wearable device. The embodiments described herein set forth various techniques to achieve to facilitate gesture recognition and which of many endpoint devices a user is attempting to control.

Conventionally, some voice-controlled devices, such as the Amazon Echo and Echo+ devices, provide a voice interface for people to easily interact with the device. These voice-controlled devices can also operates as a hub device for home automation networks to control endpoint devices, such as smart switches, smart bulbs, smart thermostats, Internet of Things (IoT) devices, or other wireless endpoint devices. Controlling endpoint devices with a voice-controlled device has some limitations. Sometimes speech has to be heard by this device from long distances or from separate rooms in order to control devices. The speech has to be recognized. For example, a light in a bedroom can be controlled by a voice-controlled device, but when the voice-controlled device is located in a completely different room, like a kitchen, a user has to shout very load in the bedroom to tell the voice-controlled device to turn-on or turn-off the light in the bedroom. In these instances, it is possible that it does not work and the user has to go to the room where the voice-controlled device is located to make it work before returning to the bedroom. Also, there are instances where a user wants to adjust the color or brightness of the light or multiple lights and the voice-controlled device can pose some security issues as the voice-controlled device may not distinguish who is talking to it. This is more problematic for other actions, like opening a door or performing some action online.

Aspects of the present disclosure address the above and other deficiencies by providing a wearable device. The wearable device does not require a user to speak, but it can intelligently detect endpoint devices (e.g., smart things) around the user and understand user intentions to distinguish which endpoint device the user is trying to control and can use a provisioned key stored in the wearable device to authenticate the user to perform a particular action on the particular endpoint device. This can increase the security of endpoint devices on a home automation network. In other embodiments, the wearable device can work with endpoint devices developed by third parties or endpoint devices connected to other Smart Home hub devices, allowing these endpoint devices on these networks to be controlled by the wearable device as well. The wearable device, as described herein, can increase the user's control capability and unify controllable endpoint devices in a home or building using a single wearable device. The wearable device can have a similar form factor as a smart band or smart watch and can be used to control various types of endpoint devices discovered in proximity to the wearable device. A smart band or a smart watch are wireless devices that can communicate with other devices using wireless local area network (WLAN) technologies, personal area network (PAN) technologies, cellular technologies (e.g., wireless wide area network (WWAN) technologies). Alternatively, the wearable device can be other form factors that permit portability by a user within a structure (e.g., a building, a house, an apartment, or the like). In short, a user, wearing the wearable device, can approach an endpoint device that the user wants to control, like a lightbulb, a switch, a curtain, a door lock, a TV, a speaker, a hot water machine, a garage door, a thermal system controller, or the like, and no matter where the user is located (e.g., at home, at an office, or other people's home or hotel, or public place), and the wearable device can authorize the use through a provisioning process with a remote server. As soon as the user is authorized through the provisioning process, the user can start to point to the nearby endpoint device and use a gesture to control the nearby endpoint device, such as to turn-on or turn-off a light, change a light color, change a light brightness, turn-up or turn-down a volume, turn-up or turn-down a temperature, open or close a curtain, turn-on or turn-off a device, lock or unlock a lock, open or close a door, open or close a garage, or the like. Because the connecting and control technology, described herein, is deployed in the wearable device, the connecting and control technology can follow a user everywhere.

The wearable device can include the capability to communicate using multiple protocols using a single radio frequency (RF) radio. The single RF radio can be a multi-band radio coupled to a multi-band antenna. The wearable device can include the capability to determine an orientation of the wearable device, including an elevation angle and an azimuth angle. The wearable device can include the capability to use machine learning to train the wearable device to understand which endpoint device the user is pointing to according to proximity data and sensor data, such as six-axis gyroscope data. The wearable device can include a six-axis gyroscope and one or more accelerometer sensors and can include a multi-mode wireless integrated circuit (IC) that supports Zigbee® and BLE technologies. A user can stand in a center of a room (or other position) and point to each endpoint device (e.g., each light bulb used in the various examples described herein) while collecting the six-axis gyroscope data and the proximity data, the proximity data representing a distance between the wearable device and the respective endpoint device. Then, the user can move around in a circle while pointing to the endpoint device during the movement, while collecting additional six-axis gyroscope data and additional proximity data from each endpoint device. The wearable device can upload the collected data to a remote server (e.g., a cloud service or cloud system) to train one or more models. The remote server can train the one or more models and the wearable device can download the one or more trained models. When the wearable device collects the six-axis gyroscope data and the proximity data, the wearable device can predict a user's location, including an indoor location, and can predict at which endpoint device the user is pointing in order to control the endpoint device.

The wearable device can include the capability to determine a proximity change pattern to predict at which endpoint device the user is pointing in order to control the endpoint device. The wearable device can collect the accelerometer sensor data only (not gyroscope data) and the wearable device can use the multi-mode wireless IC that supports Zigbee® and BLE technologies to collect proximity data. Using a target light as an example endpoint device in a room having multiple lights, the wearable device can wave its hand wearing the wearable device, while pointing to the target light so that the hand moves towards the light and then moves back away from the light. The wearable device can collect a signal strength indicator value (e.g., receive signal strength indicator (RSSI) values) from all of the lights during this movement and generates a data structure, such as a value chart, a list, a table, or the like, with the RSSI values from all of the lights. The wearable device can use the data structure to detect which light is the target light (i.e., the light to which the user is pointing). Each of the lights can be sending RF packets to the wearable device during the movement and the wearable device collects discrete RSSI values as samples through the movement. As the wearable device approaches the target device, the RSSI values can vary for some or all of the RSSI values in order to distinguish which light the user is attempting to control.

FIG. 1 is a block diagram of a wearable device 100 in an environment 101 in which multiple nearby endpoint devices are discovered by the wearable device 100 for controlling operations of the nearby endpoint device according to one embodiment. The wearable device 100 includes one or more sensors 102, a multi-protocol stack 104, and a single RF radio 106. Using the multi-protocol stack 104, the wearable device 100 can communicate with various endpoint devices via the single RF radio 106, such as a wireless endpoint device 108 that implements the IEEE 802.15.4 wireless protocol, a wireless endpoint device 110 that implements the Zigbee® wireless protocol, a wireless endpoint device 112 that implements the BLE mesh protocol, a wireless endpoint device 114 that implements the BLE wireless protocol, and a wireless endpoint device 116 that implements a third-party vendor's proprietary wireless protocol. The some of the wireless endpoint devices 108-116 can be on a same wireless network or on one or more different networks of similar or dissimilar wireless technologies.

The wearable device 100 can be a smartband device, such as illustrated in an expanded view of FIG. 1. That is the wearable device 100 can be in a form factor as a watch or band that is worn on a write of a user. Alternatively, the wearable device 100 can be other form factors that can be worn or carried by a user. The wearable device 100 can discover each of the endpoint devices 108-116 within the environment 101. The environment 101 may correspond to a range of the single RF radio 106 or a specified range, such as using a minimum threshold for excluding devices with RSSI values less than the minimum threshold. The wearable device 100 can distinguish the wireless endpoint devices 108-116 from one another when the wireless endpoint devices 108-116 are within range. A user, wearing or otherwise carrying the wearable device 100, can use different gestures to send different control commands to the respective devices. The wearable device 100 can determine which of the wireless endpoint devices 108-116 the user is pointing at or otherwise directing the gestures. Using the multi-protocol stack 104, the wearable device 100 can use an appropriate frequency, an appropriate data modulation, and appropriate wireless protocol to automatically communicate with the respective device within the environment 101. The wearable device 100 can also use an appropriate credential to communicate with endpoint devices that require a credential to be controlled.

Figure 2:
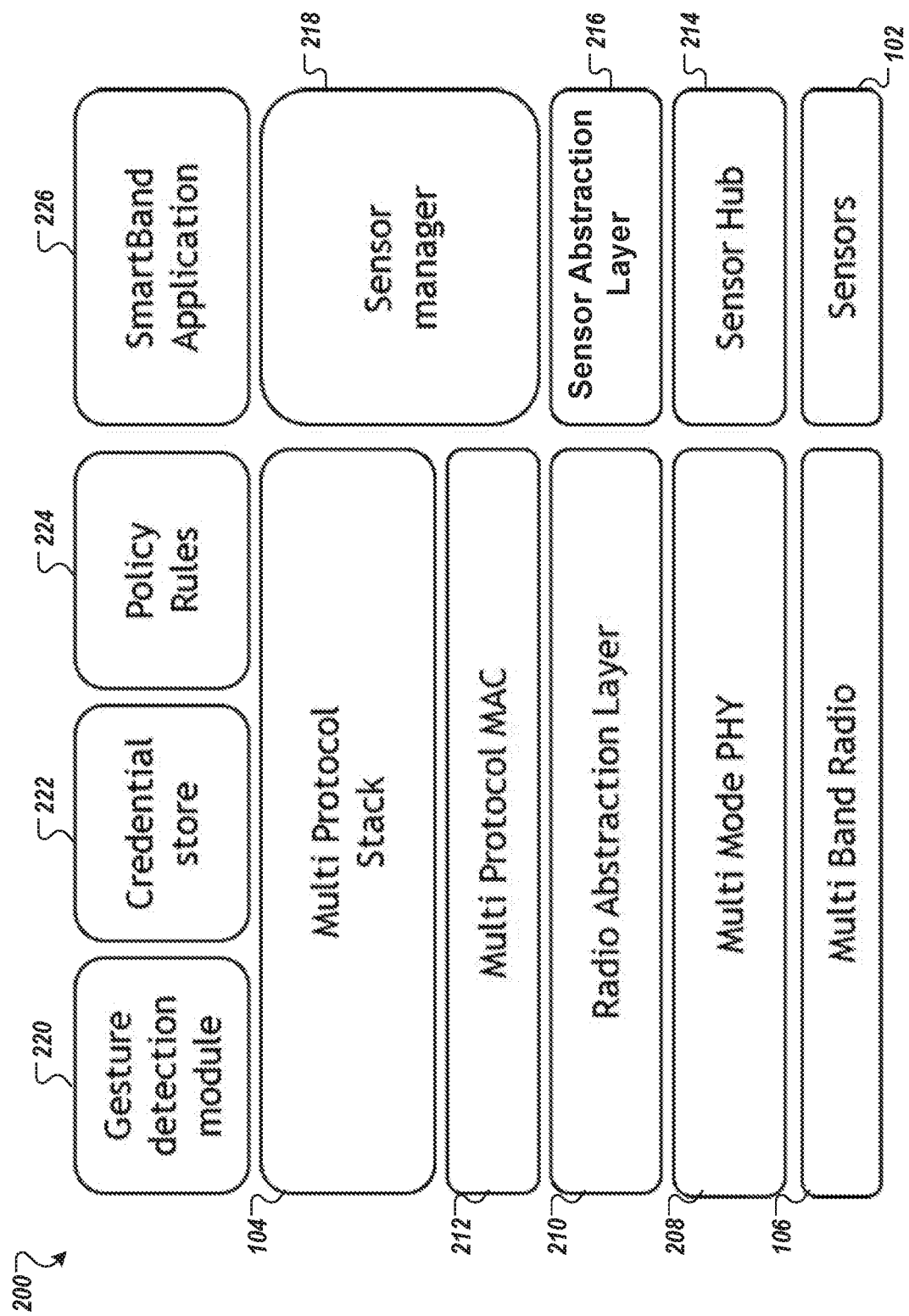
FIG. 2 is a software architecture block diagram of a wearable device according to one embodiment.

FIG. 2 is a software architecture block diagram of a wearable device 200 according to one embodiment. The wearable device 200 is similar to the wearable device 100 as noted by similar reference numbers described above. The wearable device 200 includes the one or more sensors 102, the multi-protocol stack 104, and the single RF radio 106 (e.g., multi-band radio). The one or more sensors 102 and the single RF radio 106 are hardware although illustrated in the software architecture. The wearable device 200 also includes one or more of the following software components for wireless communications. The wearable device 200 can include a multi-mode physical (PHY) layer 208 that provides PHY functionality for each of the various wireless protocols, such as BLE PHY layer functionality, Zigbee® PHY layer functionality, or the like. The multi-mode PHY layer 208 interfaces with the underlying hardware of the single RF radio 106. In other embodiments, the multi-mode PHY layer 208 is implemented in hardware with the single RF radio 106. The wearable device 200 can include a radio abstraction layer 210 that abstracts the underlying hardware, such as the multi-mode PHY layer 208 and the single RF radio 106. The wearable device 200 can include a multi-protocol MAC layer 212. The multi-protocol MAC layer 212 can handle MAC functionality for the multiple protocols supported. The multi-protocol MAC layer 212 interfaces with the hardware using the radio abstraction layer 210. The multi-protocol stack 104 of the wearable device 200 can process packets according to one of the various protocols supported by the wearable device 200. The multi-protocol stack 104 can interface with the multi-protocol MAC layer 212.

The wearable device 200 also includes one or more of the following software components for collecting and processing sensor data. The wearable device 200 can include a sensor hub layer 214, a sensor abstraction layer 216, and a sensor manager 218. The sensor hub layer 214 controls and interfaces with the one or more sensors 102. For example, each sensor can operate using different operating parameters, etc., and the sensor hub layer 214 can handle control and communications with the individual sensors, offloading some specific functions from the sensor manager 218 in collecting data from the one or more sensors 102. The sensors 102 can be developed by different vendors and can operate differently. The sensor hub layer 214 can be updated to control and communicate with each of the individual sensors in the wearable device 200. The sensor abstraction layer 216 can abstract the underling sensor hub 24, if any, and the one or more sensors 102 for the sensor manager 218 to collect data from the one or more sensors 102 without the specific functionality required by a given sensor. The sensor manager 218 can control the collecting and storing of data measured by the one or more sensors 102 via the sensor abstraction layer 216 and sensor hub layer 214.

The wearable device 200 also includes one or more of the following software components for sending and receiving data via the multi-protocol stack, for gesture recognition, for policy management, and for a device application. The wearable device 200 can include a gesture detection module 220 that is configured to detect one or more gestures performed by the user while wearing the wearable device 200, as well as distinguish between multiple possible gestures being performed. The wearable device 200 can include a credential store 222 to store one or more credentials for one or more of the endpoint devices that have been provisioned by the wearable device 200. The wearable device 200 can include a policy database 224 for storing one or more rules, one or more policies, or both. The one or more rules or one or more policies can be used to govern permissible control commands and conditions for the control commands by the wearable device 200 within one or more different environments. The wearable device 200 can also include a device application 226. The device application 226 can provide functionality to a user of the wearable device 200, such as via one or more user interfaces (e.g., a display, a button, a touchscreen, or the like).

It should be noted that the software components of FIG. 2 can be stored as instructions in one or more memory devices (not illustrated in FIG. 2) of the wearable device 200 and one or more processors (not illustrated in FIG. 2) of the wearable device 200 can execute the instructions to provide the functionality of each of the software components of the wearable device 200, such as those described and illustrated with respect to FIG. 2.

Figure 3:
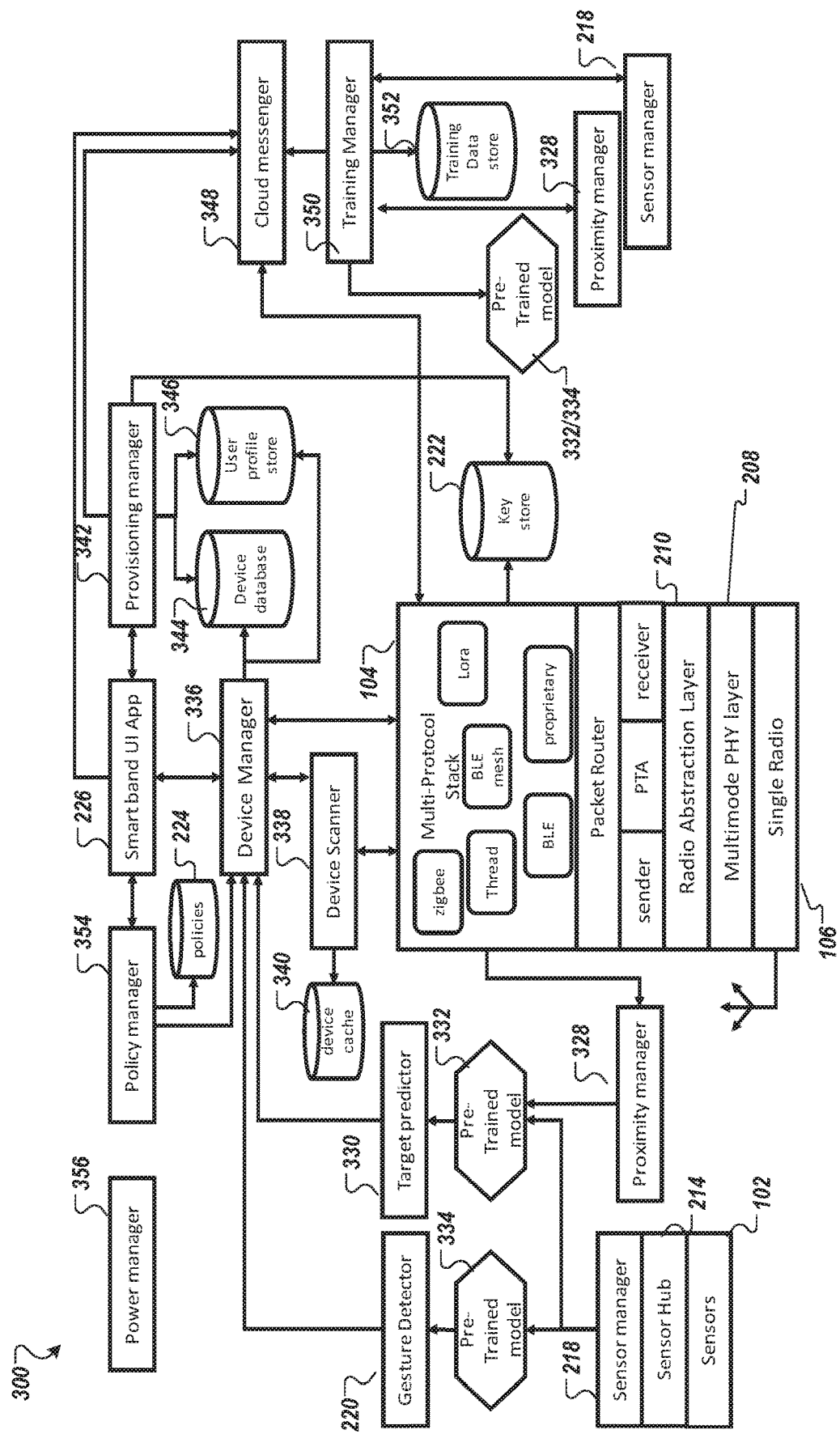
FIG. 3 is a software module collaboration diagram of software components of a wearable device according to one embodiment.

FIG. 3 is a software module collaboration diagram of software components of a wearable device 300 according to one embodiment. The wearable device 300 is similar to the wearable device 100 and wearable device 200 as noted by similar reference numbers described above. The wearable device 300 includes the one or more sensors 102, the multi-protocol stack 104, the single RF radio 106 (e.g., multi-band radio), the sensor hub layer 214, the sensor manager 218, the multi-mode PHY layer 208, the radio abstraction layer 210, the multi-protocol MAC layer 212, the gesture detection module 220, the credential store 22, the policy database 224, and the device application 226 as described above with respect to FIG. 2. Below the multi-protocol MAC layer (not illustrated in FIG. 3) can be implement a packet router, a queue for a sender, a queue for a receiver, and a packet traffic arbitrator (PTA), described in more detail below with respect to FIG. 4.

The wearable device 300 also includes some additional software components, including a proximity manager 328 that collects proximity data from the multi-protocol stack 104 and a target predictor 330 that uses proximity data from the proximity manager 328 and sensor data from the sensor manager 218 as inputs to a pre-trained model 332. The target predictor outputs a target device prediction that identifies which endpoint device the wearable device 300 is pointing at. For example, the proximity data may include RSSI values measured at the wearable device 300, where each RSSI value is indicative a distance between the wearable device 300 and an endpoint device sending packets to the wearable device 300. The target predictor 330 uses the RSSI values and the sensor data to predict the target device using the pre-trained model 332. The gesture detection module 220 (also labeled as gesture detector) similarly uses the sensor data from the sensor manager 218 as input to a pre-trained model 334 to predict a gesture performed by the user while wearing the wearable device 300. The gesture detection module 220 outputs the predicted gesture.

The wearable device 300 also includes a device manage 336. The device manager 336 can control the multi-protocol stack 104 and a device scanner 338. The device manager 336 can control the device scanner 338 to perform a discovery process (or a multi-stage discovery process) in which the device scanner 338 discovers any endpoint devices using a first protocol, any endpoints using a second protocol, and so forth, using the multi-protocol stack 104 and the underlying layers and hardware. For any endpoint devices discovered during the discovery process, the device scanner 338 can store a device identifier in a device cache 340. In addition to controlling the device scanner 338 for discovering endpoint devices, the device manager 336 can control the multi-protocol stack 104 (and underlying layers and resources) to communicate with another device via the single RF radio 106, such as when sending a message to a target device based on a detected gesture directed at the target device. The device manager 336 can also match device identifiers in the device cache 340 against device identifiers in a device database 344. The device identifiers in the device database 344 can include endpoint devices that have been provisioned by a provisioning manager 342. The device manager 336 can coordinate with a policy manager 354 to enforce one or more rules or one or more polices in the policy database 224.

The wearable device 300 can also include the device application 226, such as a user interface (UI) application that allows interaction with the user via one or more user interface devices. The device application 226 can interact with the device manager 336 to discover endpoint devices, predict target devices, predict user gestures, and communicate with endpoint devices user. The device application 226 can interact with the policy manager 354 to manage the one or more rules or one or more policies in the policy database 224. The device application 226 can interact with the provisioning manager 342 to provision one or more of the endpoint devices for controlling the endpoint devices using gestures.

In one embodiment, the device application 226 receives, via the user interface device, a request that causes the wearable device 300 to enter a first mode (e.g., a provisioning mode) in which the wearable device 300 establishes a secure wireless connection with a wireless access point device (not illustrated in FIG. 3) via the multi-protocol stack 104 and single RF radio 106. The wireless access point device can be a SmartHome hub device, a gateway, a router, a voice-controlled device (e.g., the Amazon Echo device, the Amazon Echo+device, or the like). The wireless access point device is connected to a remote server, such as a cloud system that implements on or more cloud services for provisioning the wearable device 300. The wearable device 300 downloads a first trained model for gesture predictions (e.g., pre-trained model 334), a second trained model for target device predictions (e.g., pre-trained model 332), and a device database 344 via the secure wireless connection with the wireless access point device. The device database 344 includes a set of device identifiers that represent devices registered to a user account and a controlling profile for each device of the devices registered to the user account. The controlling profile contains information, such as settings and parameters, used by the wearable device 300 to communicate with and control the wireless endpoint device. For example, the controlling profile can specify operating frequencies, operating bands, modulation schemes, security parameters, protocols supported, control functions that are controllable remotely, or the like. For example, a controlling profile for a light bulb could include the wireless technology used to communicate data, a list of controls to turn-on and turn-off the device, to adjust a brightness of the light, to adjust the color or the light bulb, or the like. Each device in the device database 344 can include different controlling profiles. In some embodiments, some devices can be grouped and can use the same grouping profile, such as a set of light bulbs. The wearable device 300 can also download a user profile store 346. The user profile store 346 can includes a set of one or more user profiles that are registered to the user account. The wearable device 300 can transition from the first mode to a second mode in which the wearable device 300 discovers a set of nearby devices using the multi-protocol stack 104 and the single RF radio 106. The wearable device 300 can transition from the first mode to the second mode in response to motion of the wearable device. For example, the wearable device 300 can detect motion by the user, such a user waving their hand and pointing to a device that the user desires to control. The wearable device 300 can be in an idle mode between the first mode and the second mode. The wearable device 300, in response to the detected movement, can wake (i.e., power-up the multi-protocol stack 104 and the single RF radio 106) to initiate a device scanning procedures by the device scanner 338. In some cases, the wearable device 300 uses two or more different protocols of the multi-protocol stack 104 to discover the nearby devices. For example, the wearable device 300 can discover a first wireless endpoint device using a first protocol and a second wireless endpoint device using a second protocol that is different than the second protocol. The first wireless endpoint device can be an IoT device, an internet-compatible device, a smart device, or the like. In the second mode, the wearable device 300 can authenticate the first wireless endpoint device and the second wireless endpoint device against the devices registered to the user account in the device database 344. If the first and second endpoint devices are authenticated, the wearable device 300, using the sensor manager 218, can collect angle data and acceleration data from the one or more sensors 102. The one or more sensors 102 may include a motion sensor (also referred to as motion tracking sensor) that includes a multi-axis gyroscope and an accelerometer sensor. The multi-axis gyroscope can be a 3-axis gyroscope, a 6-axis gyroscope, or the like. The motion tracking sensor can include one or more accelerometer sensors, such as one for each axis. The angle data can include multiple angles, each between the wearable device 300 and a respective endpoint device. For example, the angle data includes a first angle between the wearable device 300 and the first wireless endpoint device and a second angle between the wearable device 300 and the second wireless endpoint device. The wearable device 300, using the proximity manager 328, can collect proximity data measured by the single RF radio 106 in the second mode. The proximity data can include signal strength values, such as RSSI values measured by the single RF radio 106 when receiving communications from the endpoint devices. For example, the proximity data includes a first RSSI value and a second RSSI value, the first RSSI value being measured at the single RF radio 106 and being indicative of a first distance between the wearable device 300 and the first wireless endpoint device and the second RSSI value being measured at the single RF radio 106 and being indicative of a second distance between the wearable device 300 and the second wireless endpoint device. The wearable device 300, using the first trained model and the acceleration data, can predict a first gesture performed by the wearable device 300. The wearable device 300 can use the gesture detection module 220 and the pre-trained model 334 described above to predict the first gesture. The first gesture is associated with a first command or first message. The first command or first message can be associated with the first gesture in the policy database 224 or the device database 344, as described herein. The wearable device 300, using the second trained model, the angle data, and the proximity data, can predict a target device prediction from between the first wireless endpoint device and the second wireless endpoint device. The target device prediction is indicative to which of the first wireless endpoint device and the second wireless endpoint device the first gesture is directed. For example, a user of the wearable device 300 can intend to control (or desire to control) a specific endpoint device, and the target device prediction identifies which device the user is intending to control. Alternatively, the wearable device 300 can predict, using the second trained model, the angle data, and the proximity data, that the figure gesture is directed at the second wireless endpoint device or the first wireless endpoint device specifically. The wearable device 300 can send, using the appropriate protocol, the first command to the predicted target device. For example, the wearable device 300 sends the first command to the second wireless endpoint device using the second protocol.

In one embodiment, the wearable device 300 discovers, in a second mode, a first wireless light bulb and a second light bulb. The wearable device 300 determines first angle data between the wearable electronic device 300 and the first wireless light bulb and second angle data between the wearable electronic device 300 and the second wireless light bulb. The wearable device 300 determines, in the second mode, a first RSSI value and a second RSSI value. The first RSSI value is measured at the single radio and is indicative of a first distance between the wearable electronic device 300 and the first wireless light bulb and the second RSSI value is measured at the single radio and is indicative of a second distance between the wearable electronic device 300 and the second wireless light bulb. The wearable device 300 determines, using the first trained model and acceleration data received from the motion tracking sensor, a first gesture performed by a user of the wearable electronic device 300. The first gesture is associated with a first command. The wearable device 300 determines, using the second trained model, the angle data, and the proximity data, that the first gesture was associated with the second wireless light bulb and sends, to the second wireless light bulb, data associated with the first command.

In a further embodiment, the wearable device 300 verifies that the second wireless light bulb is among the devices registered to the user account in the device database before the data associated with the first command is sent to the second wireless light bulb. In another embodiment, the wearable device 300 verifies that the second RSSI value exceeds a RSSI threshold specified in a rule stored in a policy database before the data associated with the first command is sent to the second wireless light bulb. The policy database can include user-customization rules, as input or defined by a user of the wearable device 300. Alternatively, the policy database includes system rules or policies that are not input or defined by a particular user.

In another embodiment, the wearable device 300 determines first historical angle data between the wearable electronic device and the first wireless light bulb. The wearable device 300 also determines second historical angle data between the wearable electronic device and the second wireless light bulb before downloading the second trained model from the wireless access point device. The wearable device 300 also determines first historical RSSI values, each corresponding to a distance between the wearable electronic device and the first wireless light bulb, and second historical RSSI values, each corresponding to a distance between the wearable electronic device and the second wireless light bulb. The wearable device 300 sends the first historical angle data, the first historical RSSI values, the second historical angle data, and the second historical RSSI values to a remote server. The remote server trains the second trained model using the first historical angle data, the first historical RSSI values, the second historical angle data, and the second historical RSSI values. The wearable device 300 receives the second trained model from the remote server after the remote server trains the second trained model. In another embodiment, a smartband UI application of a smartband device provides a user interface to user, such as touch screen menu to control device and show information. The user can use the menu to switch the smartband device to a "provisionee" mode and the provisioning manager 342 can connect with a wireless access point device, such as the Amazon Echo device through a secured BLE connection and download the device database 344 and the user profile store 346. The provisioning manager 342 can also download policies for the policy database 224 through the secure BLE connection with the wireless access point device. After the provisioning is complete, the user can start a training procedure to train the smartband device on how to control endpoint devices. A training manager 350 is responsible for collecting sensor data (e.g., angle data) from the sensor manager 218 and RSSI value (or other proximity data) from the proximity manager 328. The training manager 350 stores the sensor data and the proximity data as training data in a training data store 352. The training manager 350 can send the training data using a cloud messenger 348. The cloud messenger 348 can send the training data to a remote server, such as to a cloud service to train the one or more models described herein. After the one or more models are trained, the trained models can be downloaded into the smartband device for future target prediction and gesture prediction. For example, the training manager 350 can download the pre-trained model 332 and the pre-trained model 334 to be used by the target predictor 330 and the gesture detection module 220, respectively, as described above. Using the pre-trained model 334, the user can use gestures to control the nearby endpoint devices that are registered in the device database 344. When the user makes some motion, such as waiving a hand with the smartband device and points to the endpoint device that the user wants to control, the smartband device can wake up and start device scanning by the device scanner 338. The device scanner 338 can use the multi-protocol stack to discover nearby endpoint devices on each channel of each wireless technology corresponding to the endpoint devices in the device database 344 based on the provisioning process. For example, the device scanner 338 can instruct the multi-protocol stack to send out a beacon on channels of a first wireless technology, such as 16 channels of the Zigbee® technology, to discover nearby endpoint devices that utilize the first wireless technology. After the device scanner 338 scans with the first wireless technology, the device scanner 338 can start to scan for endpoint devices that use a second wireless technology, such as the BLE technology. After the device scanner 338 can start to scan for endpoint devices that use a third wireless technology, such as the BLE mesh technology, and so forth until all devices are discovered. The device identifiers of these devices are stored in the device cache 340. During the discovery process, the device scanner 338 can match the discovered devices against the devices in the device database 344. In some embodiments, in addition to matching devices between the device cache 340 and the device database 344, the discovered devices can be filtered based on rules in the policy database 224, filtered based on RSSI values, such as the RSSI values exceeding a minimum threshold, indicating that the endpoint device may not be close enough to control. The angle information and the RSSI values of the nearby endpoint devices are collected and feed into the target predictor 330 to predict a target device prediction, identifying which of the nearby endpoint devices is pointed at by the smartband device. The device information can be sent to the device manager 336 to proceed with the process. Also, the acceleration data is collected by the sensor manager 218 and feed into the gesture detection module 220 to analyze and predict a user gesture based on movement of the user's hand with the smartband device. The device manager 336 can receive an indication of the user gesture predicted and the device manager 336 can convert the user gesture to a command. For example, the gesture and the command can be associated in the device database 344, the user profile store 346, or both. For example, the user gesture could correspond to a command to turn-on or turn-off the endpoint device, increase a volume or decrease the volume of an endpoint device. Alternatively, the gesture detection module 220 can convert the user gesture to the command and can send the command to the device manager 336 to proceed. The device manager 336 can receive the command and the device information and can retrieve, from the device database 344 using the device information, a detailed controlling profile of the endpoint device being controlled. The device manager 336 can send a request to the multi-protocol stack to send the command over the radio abstraction layer. The multi-protocol stack can handle packet formatting and encrypting the packet using a Link key and a Network key, such as an appropriate APS key and Network key that can be retrieved from the credential store 222. The credential store 222 be or can include a key store that stores one or more keys corresponding to one or more layers of the protocol stack, such as the Link key and Network key. The credential store 222 can include one or more keys for each of the wireless endpoint devices identified in the device database 344. The multi-mode PHY layer 208 can do the PHY configuration and send the packets, as well as all handshake communications with the targeted endpoint device. The device manager 336 can also coordinate with the policy manager 354 to handle the automatic device control based on a rule identified in the policy database 224.

Figure 4:
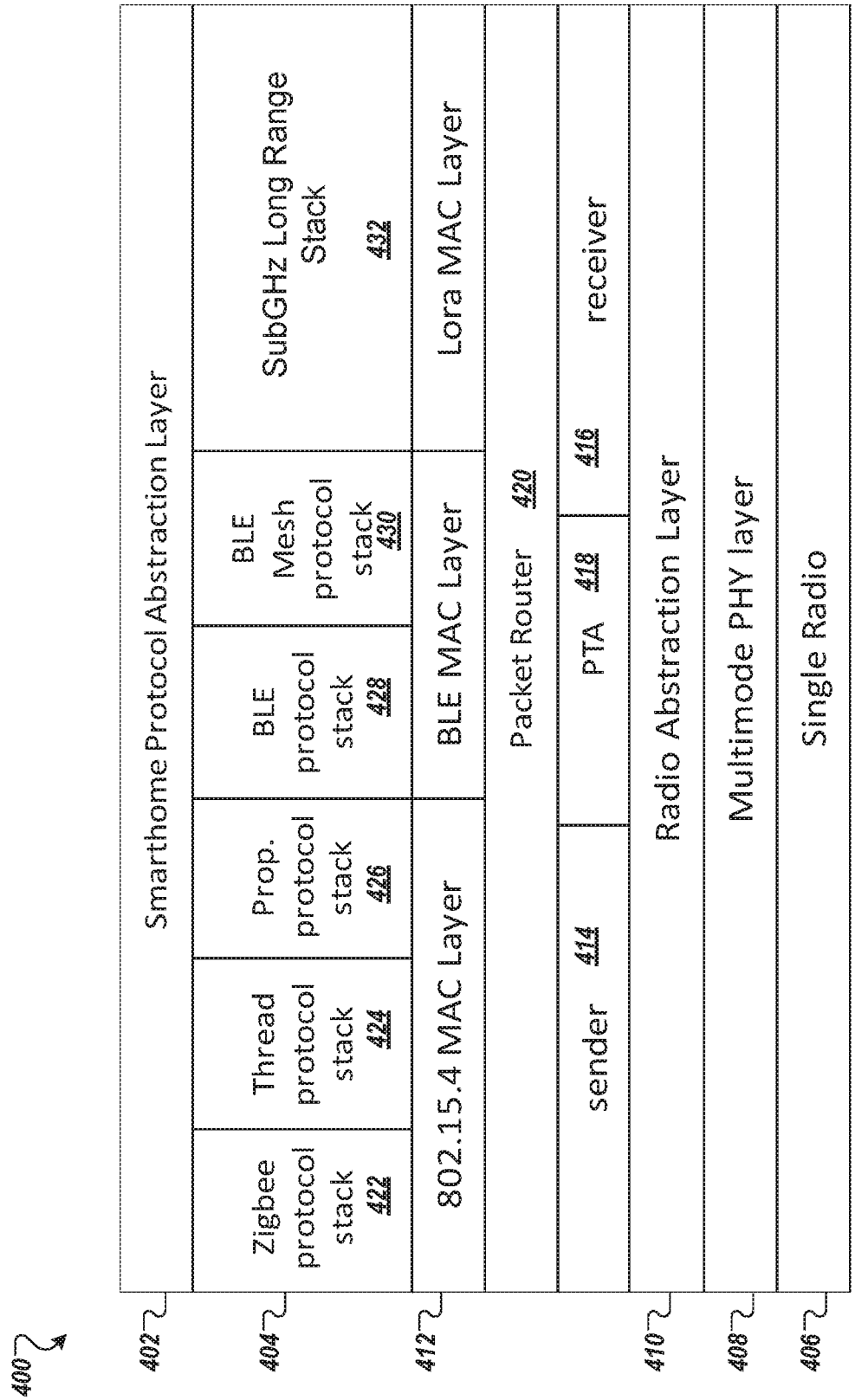
FIG. 4 is block diagram illustrating a detailed design of a multi-protocol stack according to one embodiment.

FIG. 4 is block diagram illustrating a detailed design of a multi-protocol stack 400 according to one embodiment. The multi-protocol stack 400 includes two abstraction layers, including a protocol abstraction layer 402 and a radio abstraction layer 410. The protocol abstraction layer 402 provides a unified interface for upper layers, regardless of the multiple wireless technologies that are being used in the lower layers. The radio abstraction layer 410 provides a unified interface for upper layers to access a multi-mode PHY layer 408. The multi-protocol stack 400 also includes a single radio 406 under the multi-mode PHY layer 408. The multi-protocol stack 400 further includes a sender 414 and a receiver 416 that sit on top of the radio abstraction layer 410. The sender 414 is configured to send data packets over the multi-mode PHY layer 408. The receiver 416 is configured to receive data packets over the multi-mode PHY layer 408. A PTA 418 can be used to configure the multi-mode PHY layer 408 and the radio abstraction layer 410 to operate at an appropriate frequency, using an appropriate modulation, and at an appropriate time slot. A packet router 420 is a generic packet routing manager that is responsible for dispatching the data packets received from the multi-mode PHY layer to one of the multiple protocols in a multi-protocol stack layer 404 for processing. As an example, the multi-protocol stack layer 404 includes a Zigbee protocol stack 422, a thread protocol stack 424, a third-party vendor proprietary protocol stack 426, a BLE protocol stack 428, a BLE mesh protocol stack 430, and a Low power, Long Range (LoRa) protocol stack 432. Alternatively, the multi-protocol stack layer 404 can include more or less wireless protocol stacks, as well as different types of protocol stacks based on the wireless technologies being used. The packet router 420 can send a request to the PTA 418 to configure the multi-mode PHY layer 408 for sending the data packet using the respective wireless technology. The packet router 420 can use a sender queue and a receiver queue, as well as a dedicated thread to manage each of the sender queue and the receiver queue. A multi-mode MAC layer 412 can includes multiple MAC layers, for example, a 802.15.4 MAC layer 434, a BLE MAC layer 436, and a LoRA MAC layer 438. These multiple MAC layers are responsible for handling the point-to-point MAC layer link level communications, as well as for packing and unpacking the MAC format of the data packets. The multi-mode MAC layer 412 can manage the MAC sequence number (SN) and RSSI values of each of the data packets. The multi-mode MAC layer 412 can handle MAC acknowledgements and not acknowledgments (NAC) and retransmissions, or the like. Above the multi-mode MAC layer 412, the multi-protocol stack layer 404 can manage mesh network layer packet encoding, decoding, device authentication, and authorization. The multi-protocol stack layer 404 can handle the routing the data. In some embodiments, the wearable device does not support multi-hop routing to resolve routing establishment that causes problems in traditional solutions.

Figure 5:
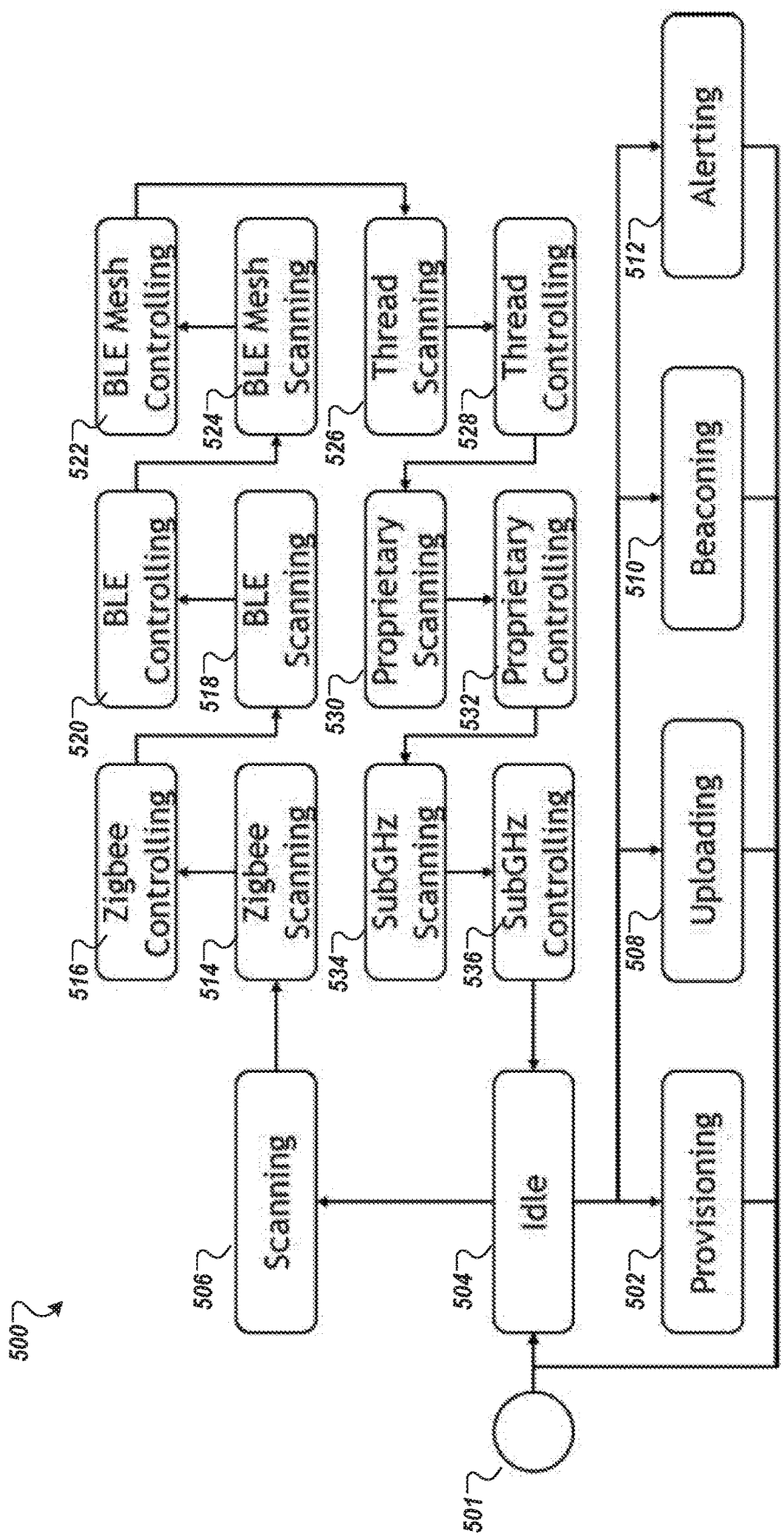
FIG. 5 is state diagram of a hardware state machine of a wearable device according to one embodiment.

FIG. 5 is state diagram of a hardware state machine 500 of a wearable device according to one embodiment. The hardware state machine 500 includes a provisioning mode 502, an idle mode 504, and a scanning mode 506. The hardware state machine 500 can also include an uploading mode 508, a discovery mode 510 (also referred to as beaconing or scanning), and an alerting mode 512. The hardware state machine 500 can start in a root mode, such as at power-up or boot. The hardware state machine 500 can transition into the idle mode 504. While in idle mode 504, the wearable device can receive a request to provision the wearable device. In such cases, the hardware state machine 500 transitions the provisioning mode 502. In the provisioning mode 502, the hardware state machine 500 can perform a provisioning process, such as described herein. During the provisioning procession various operations can be performed to store device identifiers of possible nearby endpoint devices that can be controlled by the wearable device. The operations may also store keys or credentials needed to communicate with these endpoint devices. The operations can also store user profiles, policies, rules, as well as pre-trained models used for predicting user gestures and target device predictions. Once the provisioning process is completed, the hardware state machine 500 transitions from the provisioning mode 502 to the idle mode 504.

In response to a request, such as a user request, or in response to detected motion of the wearable device, the hardware state machine 500 can wake up from being in the idle mode 504 and transition to the scanning mode 506. In the scanning mode 506, the hardware state machine 500 can start a first scanning process 514 with a first wireless technology (e.g., labeled as Zigbee scanning) to detect any nearby endpoint devices using the first wireless technology. Once the first scanning process 514 is completed, the hardware state machine 500 can start a first controlling process for controlling an endpoint device using the first wireless technology (e.g., labeled as Zigbee controlling). The first controlling process can control the endpoint device when the endpoint device is determined to be the target device to be controlled by a user gesture.

Once the first controlling process 516 is completed, the hardware state machine 500 can start a second scanning process 518 with a second wireless technology (e.g., labeled as BLE scanning) to detect any nearby endpoint devices using the second wireless technology. Once the second scanning process 518 is completed, the hardware state machine 500 can start a second controlling process 520 for controlling an endpoint device using the second wireless technology (e.g., labeled as BLE controlling). The endpoint device can be controlled using the second wireless technology when the endpoint device is determined to be the target device to be controlled by the user gesture.

Once the second controlling process 520 is completed, the hardware state machine 500 can start a third scanning process 522 with a third wireless technology (e.g., labeled as BLE mesh scanning) to detect any nearby endpoint devices using the third wireless technology. Once the third scanning process 522 is completed, the hardware state machine 500 can start a third controlling process 524 for controlling an endpoint device using the third wireless technology (e.g., labeled as BLE mesh controlling). The endpoint device can be controlled using the third wireless technology when the endpoint device is determined to be the target device to be controlled by the user gesture.

Once the third controlling process 524 is completed, the hardware state machine 500 can start a fourth scanning process 526 with a fourth wireless technology (e.g., labeled as thread scanning) to detect any nearby endpoint devices using the fourth wireless technology. Once the fourth scanning process 526 is completed, the hardware state machine 500 can start a fourth controlling process 528 for controlling an endpoint device using the fourth wireless technology (e.g., labeled as thread controlling). The endpoint device can be controlled using the fourth wireless technology when the endpoint device is determined to be the target device to be controlled by the user gesture.

Once the fourth controlling process 528 is completed, the hardware state machine 500 can start a fifth scanning process 530 with a fifth wireless technology (e.g., labeled as proprietary scanning) to detect any nearby endpoint devices using the fifth wireless technology. Once the fifth scanning process 530 is completed, the hardware state machine 500 can start a fifth controlling process 532 for controlling an endpoint device using the fifth wireless technology (e.g., labeled as proprietary controlling). The endpoint device can be controlled using the fifth wireless technology when the endpoint device is determined to be the target device to be controlled by the user gesture.

Once the fifth controlling process 532 is completed, the hardware state machine 500 can start a sixth scanning process 534 with a sixth wireless technology (e.g., labeled as SubGHz scanning) to detect any nearby endpoint devices using the sixth wireless technology. Once the sixth scanning process 534 is completed, the hardware state machine 500 can start a sixth controlling process 536 for controlling an endpoint device using the sixth wireless technology (e.g., labeled as SubGHz controlling). The endpoint device can be controlled using the sixth wireless technology when the endpoint device is determined to be the target device to be controlled by the user gesture.

Once the sixth controlling process 536 is completed, the hardware state machine 500 can transition back to the idle mode 504. It should be noted that the hardware state machine 500 is an example of a wearable device that supports sixth wireless technologies. In other embodiments, the wearable device can support more or less wireless technologies than six. Alternatively, the wearable device can support other wireless technologies than those set forth in FIG. 5.

In response to a first signal received, a first request received, or a first condition detected while in the idle mode 504, the hardware state machine 500 can transition to the uploading mode 508 to upload data to a remote server, as described herein. In response to a second signal received, a second request received, or a second condition detected while in the idle mode 504, the hardware state machine 500 can transition to the discovery mode 510 to perform discovery of nearby devices, such as in connection with the provisioning process in the provisioning mode 502. In response to a third signal received, a third request received, or a third condition detected while in the idle mode 504, the hardware state machine 500 can transition to the alerting mode 512 to alert other devices, such as the remote server, a wireless access point device, or the endpoint devices of an alert.

The embodiments described herein provide various features, including a point-to-point ad-hoc device communication using various different wireless protocols and technologies, device discovery procedures, provisioning procedures, multi-mode PHY controller, gesture detection algorithms, including machine-learning based gesture recognition, and indoor positioning algorithms, including machine-learning based position and orientation algorithms.

Figure 6:
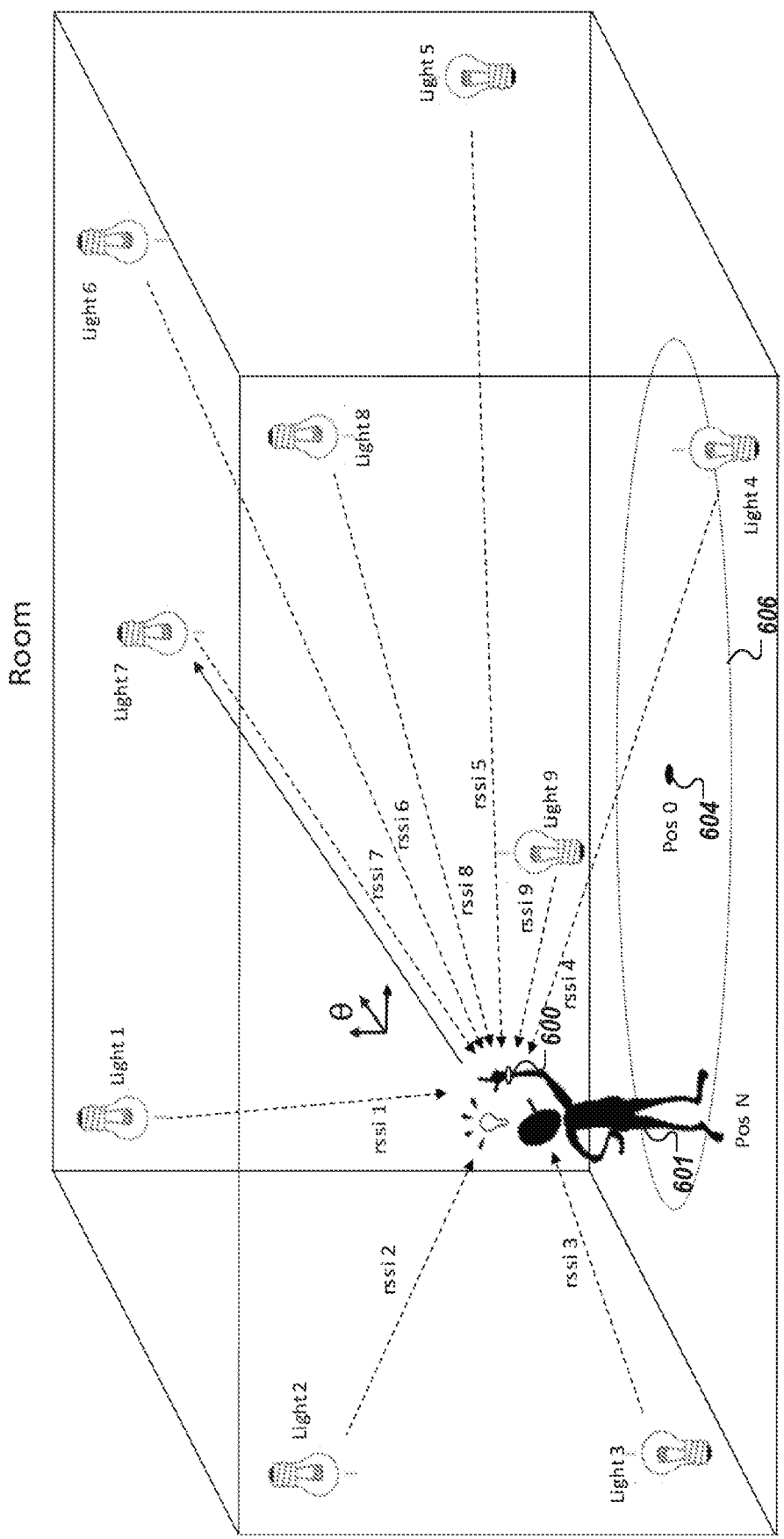
FIG. 6 illustrates an example of training a model for target device predictions and user gesture predictions by a wearable device according to one embodiment.

FIG. 6 illustrates an example of training a model for target device predictions and user gesture predictions by a wearable device according to one embodiment. A user 601 wears a wearable device 600, such as on a wrist of the user's hand. The wearable device 600 can include a motion tracking sensor with a six-axis gyroscope and one or more accelerometer sensors. The wearable device 600 can also include a multi-mode wireless System on Chip (SoC) supporting Zigbee® and BLE technologies. In this example, the endpoint devices are smart light bulbs that can communicate using either the Zigbee® or BLE technologies. The user 601 stands in a first position 604, such the center of a room, and points to each light and collects the proximity data (RSSI values) and sensor data (e.g., 6-axis gyroscope data). The User 601, then moves inside the room in a circle 606 and points to the lights at multiple positions along the circle 606. 6-axis gyroscope data) for each light. The wearable device 600 can upload the collected data from each of the positions to a remote server to train the model. After the remote server trains the model, the wearable device 600 can download the trained model and can use the trained model, along with currently collected sensor data and proximity data, to predict which light the user 601 is pointing to and to predict user gestures by the user 601 to control the light. The trained model can be used to predict the user's indoor location and which light the user 601 is pointing at within the room. Although lights are used for the example of FIG. 6, in other embodiments, any endpoint device can be detected, distinguished from one another, and controlled in a similar manner, i.e., user gestures predicted by the trained model and position and angle of the user 601 to predict an indoor location of the user 601.

Figure 7:
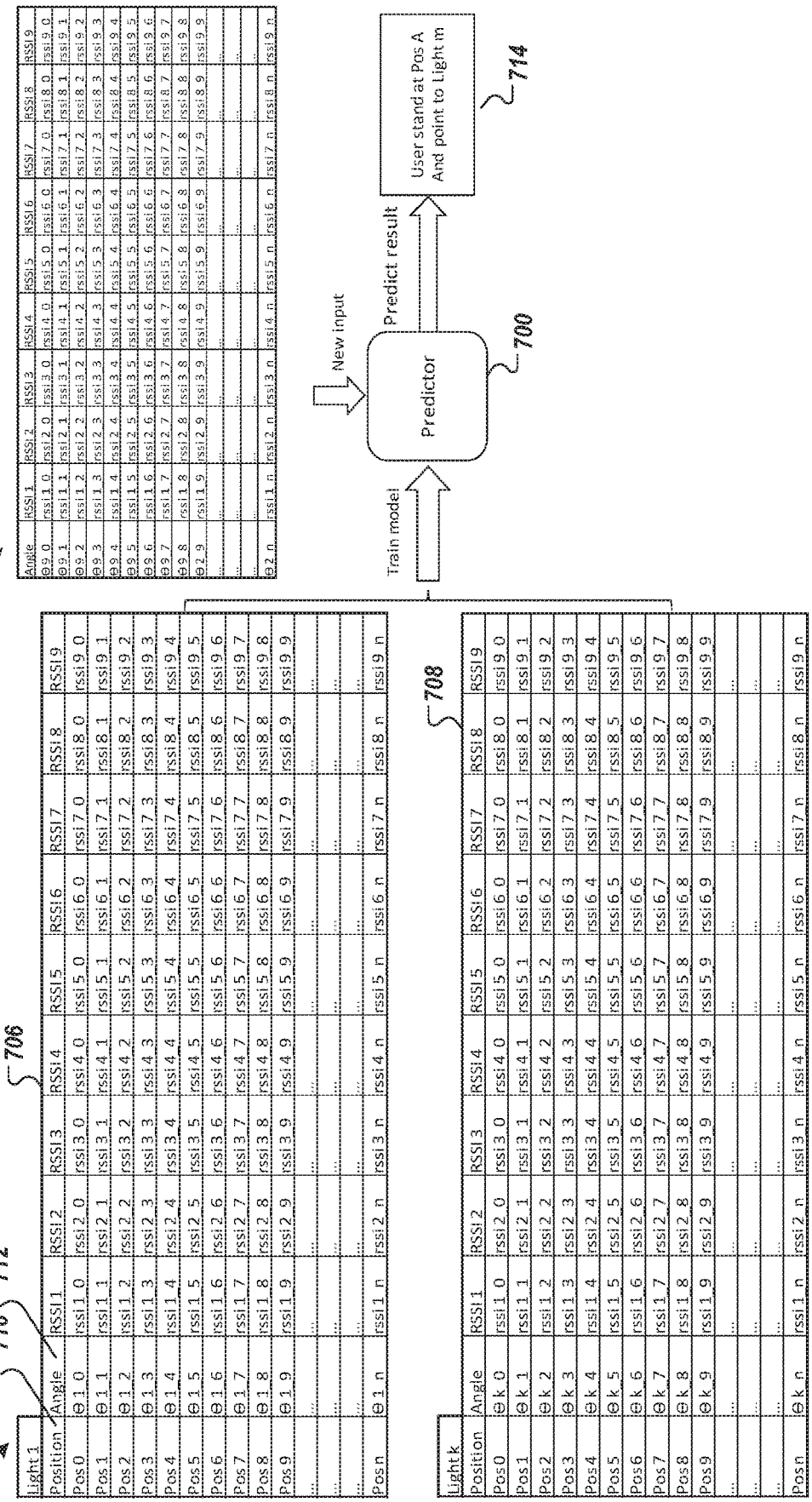
FIG. 7 illustrates an example training data set, an example current data set, and a predictor of a wearable device to predict a user standing at a specific position and pointing to a specific light according to one embodiment.

FIG. 7 illustrates an example training data set 702, an example current data set 704, and a predictor 700 of a wearable device to predict a user standing at a specific position and pointing to a specific light according to one embodiment. The example training data set 702 includes a table for each light. For example, FIG. 7 illustrates a first table 706 for the first light (Light1) and a kth table 708 for the kth light (Lightk). The first table 706 includes a position 710 and an angle 712 of the user 601 while pointing at the first light and the collected data at the respective position 710 and at the respective angle 712 of the user 601. As noted above, the user 601 can stand in a first location, such as the center of the room, and then can move to different positions in the circle, while pointing to each light at the respective position to collect the data for the tables. For example, the first table 706 includes an RSSI value for each light at each of the position 710 and angle combinations 712. Since there were nine lights in the example of FIG. 6, the first table includes 9 columns of RSSI values for each position 710 and angle 712. Each RSSI value is measured at the wearable device and is indicative of a distance between the wearable device and the respective light. The RSSI value can be measured from communications received from the respective light by the wearable device. The kth table 708 can include similar RSSI values for the same position and angle combinations. The tables in the training data set 702 are feed to a remote server to train the model, referred to herein as the predictor 700.

Once trained, the predictor 700 can be deployed at the wearable device to predict a position and at which light the user is pointing to. The wearable device can collect new input by collecting sensor data. For example, the RSSI values can be measured for each of the angle. The new data is input into the predictor 700 and the predictor 700 predicts a result 714. The result includes a prediction that the user is standing a specific position (position A) and is pointing at a specific light (light m). This information can be used to control the specific light m. The result can also include a prediction of the user gesture. This prediction can be made by the predictor 700, but based on acceleration data. Alternatively, the user gesture prediction can be determined by a separate predictor that is trained to predict user gestures.

Figure 8:
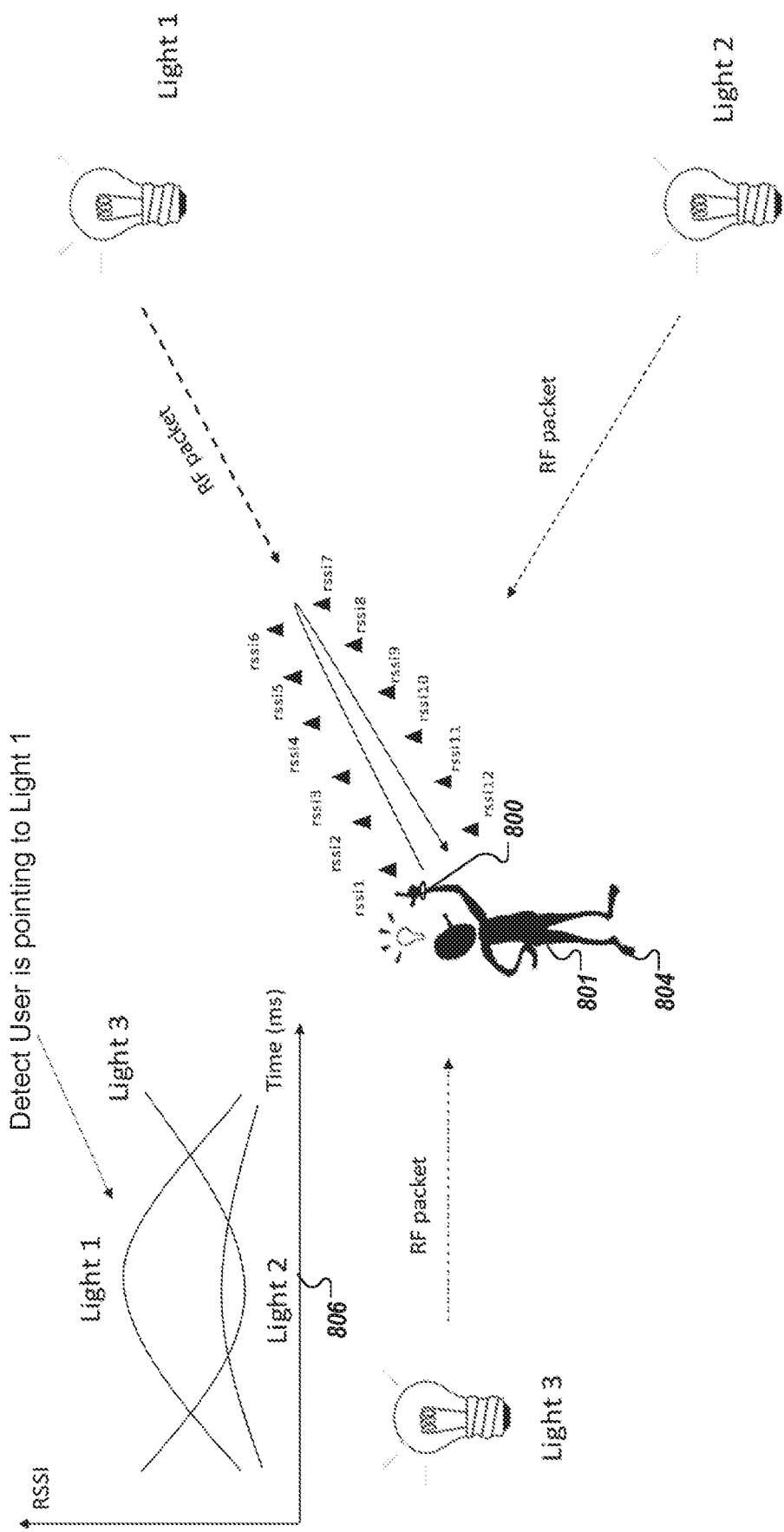
FIG. 8 illustrates an example of using a proximity change pattern, detected by a wearable device, to predict which endpoint device the user is pointing at according to one embodiment.

FIG. 8 illustrates an example of using a proximity change pattern, detected by a wearable device 800, to predict which endpoint device the user is pointing at according to one embodiment. A user 801 wears a wearable device 800, such as on a wrist of the user's hand. The wearable device 800 can include a motion tracking sensor with only one or more accelerometer sensors (not a gyroscope). The wearable device 800 can also include a multi-mode wireless System on Chip (SoC) supporting Zigbee® and BLE technologies. In this example, the endpoint devices are smart light bulbs that can communicate using either the Zigbee® or BLE technologies. The user 801 stands in a first position 804, such between three lights and points to a first light as the target light The user 801 can wave its hand while still pointing to the target light so that the hand move towards the target light and then moves the hand back away from the target light. The wearable device 800 can collect the proximity data (RSSI values) from each of the lights in the room and the sensor data (acceleration data only) of the wearable device 800, the sensor data indicative of the movement that causes a proximity change pattern in the collected proximity data. The wearable device 800 can collect the RSSI values of all the lights during this movement and can characterize the change in the proximity pattern between the multiple lights. In one embodiment, the wearable device 800 can generate a RSSI value chart, such as illustrated in diagram 806 of FIG. 8. This data can be used to detect which light the user 801 is pointing to. In this example, the RSSI values in the RSSI value chart indicate that the user 801 is pointing to the first light as the RSSI values increase as the wearable devices moves towards the light 1 and decreases as the wearable device moves away from the light 1. Conversely, the data in the RSSI value chart indicate that the user 801 moves away from the third light as the user 801 moves the wearable device 800 towards the first light. The change in the RSSI values is more dramatic for the third light than the second light. Using the data in the RSSI data chart, the proximity change pattern can be used to predict which light the user 801 is pointing to.

Figure 9:
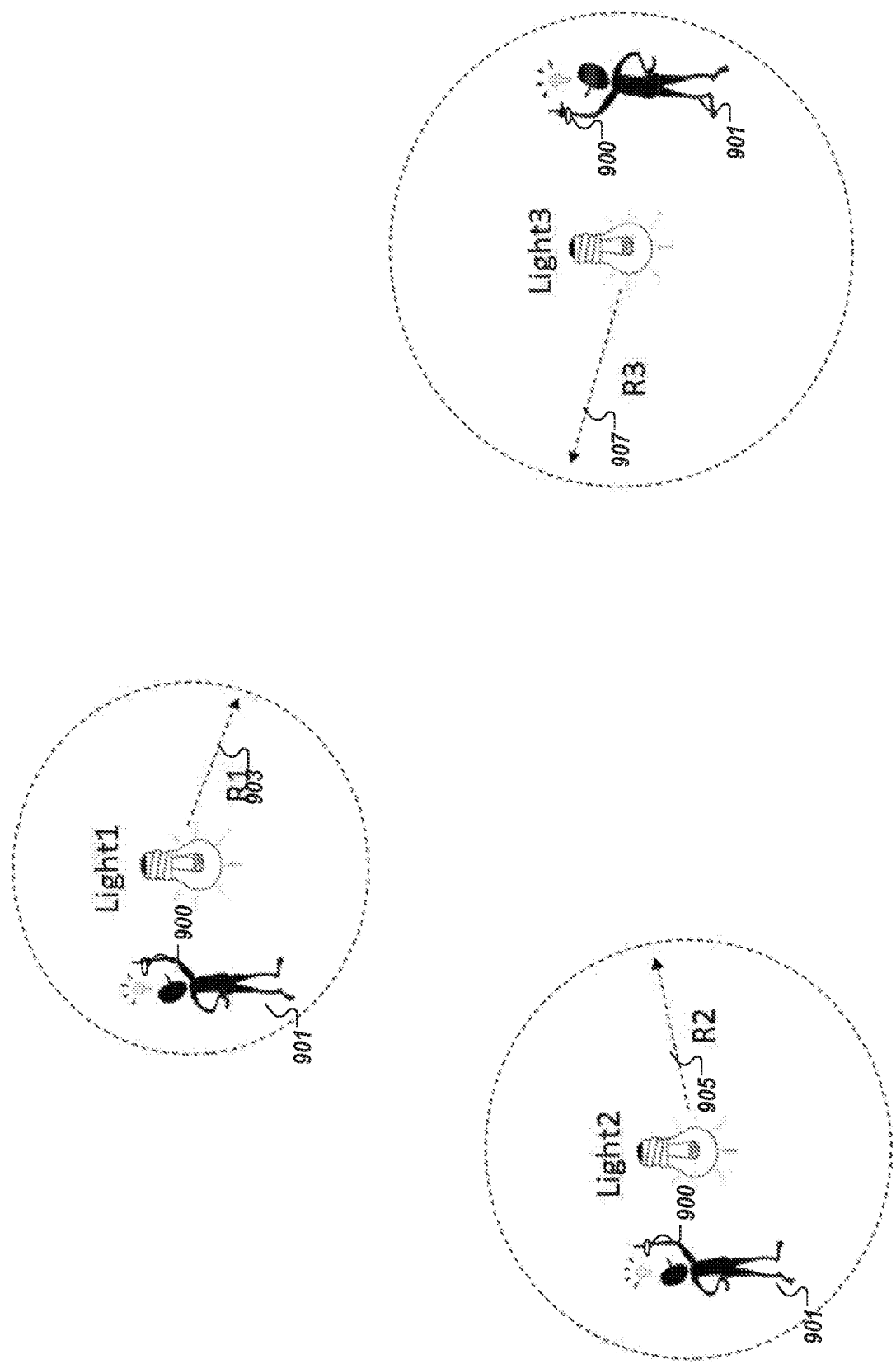
FIG. 9 illustrates an example for proximity-based target determination and automated endpoint device controlling by a wearable device according to one embodiment.

FIG. 9 illustrates an example for proximity-based target determination and automated endpoint device controlling by a wearable device 900 according to one embodiment. A user 901 wears a wearable device 900, such as on a wrist of the user's hand. The wearable device 900 can include a motion tracking sensor with only one or more accelerometer sensors (not a gyroscope). The wearable device 900 can also include a multi-mode wireless System on Chip (SoC) supporting Zigbee® and BLE technologies. In this example, the endpoint devices are smart light bulbs that can communicate using either the Zigbee® or BLE technologies. The user 901 approaches a first light and when the user 901 gests close to the light (e.g., the target device), such as within a specified distance 903 (e.g., a radius R1), the user can perform a user gesture to control the light. Based on the RSSI values, the wearable device 900 can determine that the wearable device is within the specified distance 903 and is nearest the first light. The wearable device 900 can set the first light as the target device. The user can control the light using a user gesture. The target device can be controlled as automated SmartHome controlling. When a user gest close to a target device, the wearable device 900 can set to an appropriate mode based on the user settings. The wearable device can also be used to determine which room the user 901 is in and who is the user. In some cases, the when the user 901 is determined to be in a room, the endpoint devices in the room can be set to be controlled by the wearable device 900. Similarly, the user 901 can approach a second light and, when the wearable device 900 is within a second specified distance 905 (e.g., radius R2), the wearable device 900 can control the second light. Similarly, the user 901 can approach a third light and, when the wearable device 900 is within a third specified distance 907 (e.g., radius R3), the wearable device 900 can control the second light.

Figure 10:
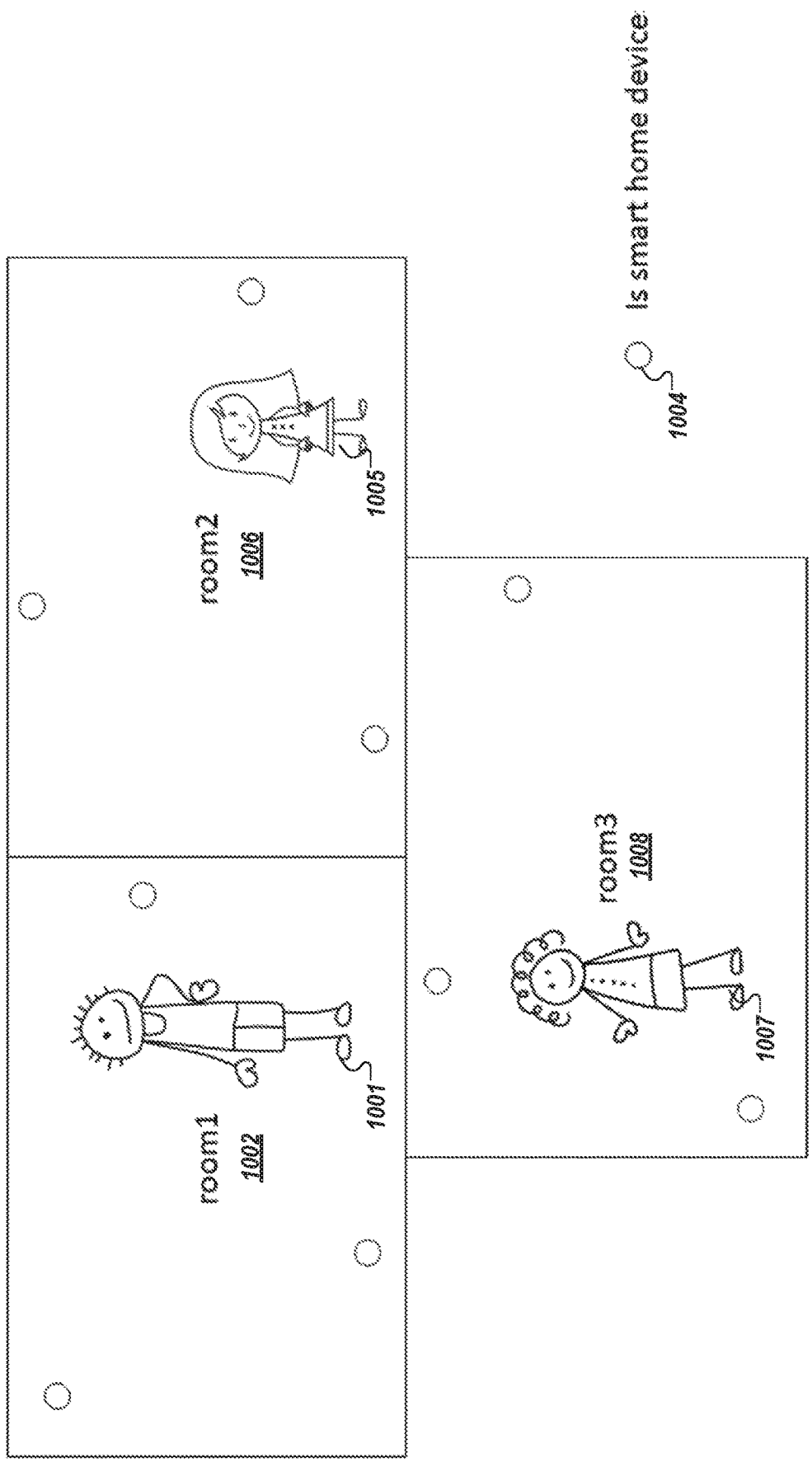
FIG. 10 is an example that illustrates the automated SmartHome controlling based on a user identity and a user location according to one embodiment.

FIG. 10 is an example that illustrates the automated SmartHome controlling based on a user identity and a user location according to one embodiment. The RSSI values from the nearby endpoint devices can be calculated to determine which room a first user 1001 is located and which user is in a first room 1002. Based on the RSSI values collected from the nearby endpoint devices, the first user 1001 can be determined to be in a first room 1002 in which there is a first set of one or more endpoint devices 1004. Based on the RSSI values collected from the nearby endpoint devices, a second user 1005 can be determined to be in a second room 1006 in which there is a second set of one or more endpoint devices 1004. Based on the RSSI values collected from the nearby endpoint devices, a third user 1007 can be determined to be in a third room 1008 in which there is a third set of one or more endpoint devices 1004. The users can switch between a manual mode and an automated SmartHome controlling mode in which user gestures are used to control the endpoint devices.

Figure 11:
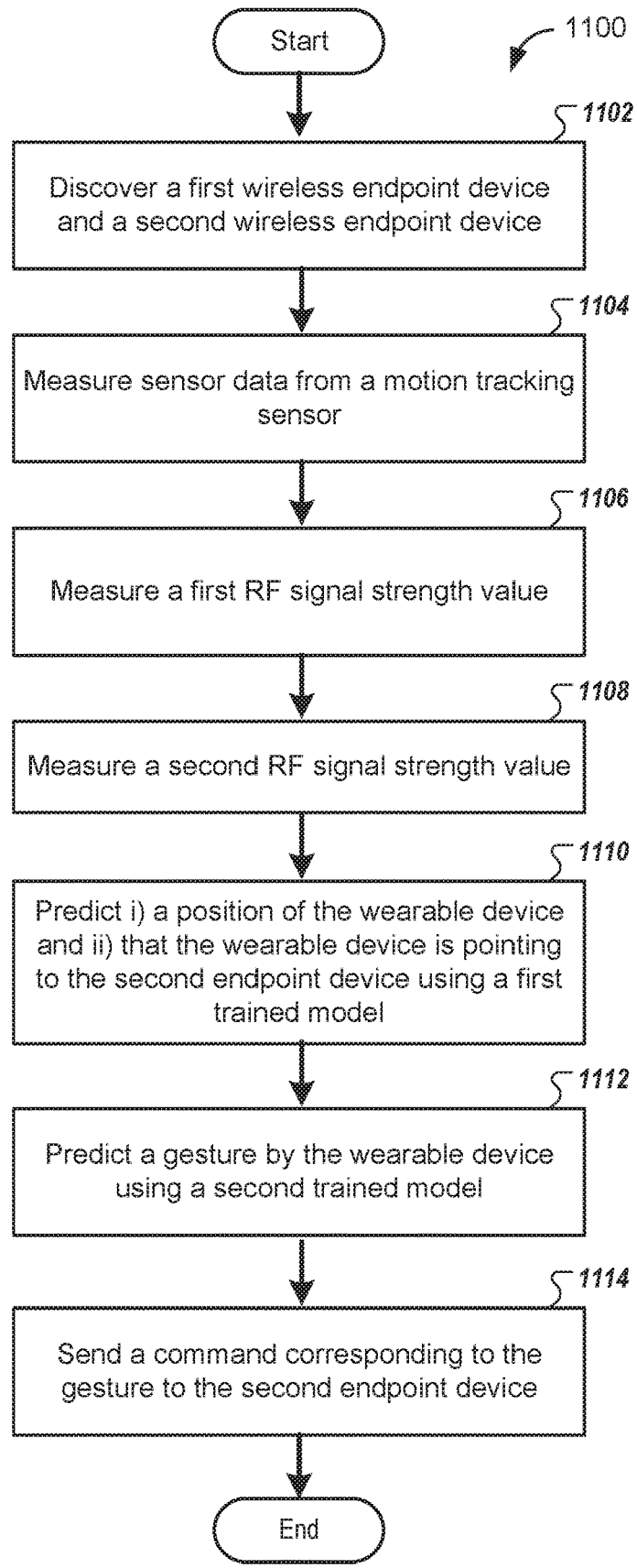
FIG. 11 is a flow diagram illustrating a method 1100 of operating a wearable device for predicting a user gesture and predicting a target device to which a user is pointing according to one embodiment.

FIG. 11 is a flow diagram illustrating a method 1100 of operating a wearable device for predicting a user gesture and predicting a target device to which a user is pointing according to one embodiment. The method 1100 may be performed by processing logic that comprises hardware (e.g., circuitry, dedicated logic, programmable logic, microcode, etc.), software, firmware, or a combination thereof. In one embodiment, method 1100 may be performed by any of the wearable devices described herein and illustrated with respect to FIGS. 1-10.

Referring to FIG. 11, the method 1100 begins by the processing logic discovering a first wireless endpoint device and a second wireless endpoint device via a radio of the wearable device (block 1102). The processing logic measures sensor data from a motion tracking sensor of the wearable device (block 1104). The motion tracking sensor can include a including a six-axis gyroscope and an accelerometer. The sensor data includes a first angle between the wearable device and the first wireless endpoint device and a second angle between the wearable device and the second wireless endpoint device. The sensor data also includes motion data indicative of motion of the wearable device over a first duration of time. The processing logic measures a first radio frequency (RF) signal strength value (e.g., first RSSI value) of a first wireless communication received from the first wireless endpoint device via the radio (block 1106). The processing logic measures a second RF signal strength value of a second wireless communication received from the second wireless endpoint device via the radio (block 1108). The processing logic predicts i) a position of the wearable device and ii) which of the first wireless endpoint device and the second wireless endpoint device the wearable device is pointing to (block 1110). The processing logic makes the predictions by using the first angle, the second angle, the first RF signal strength value, the second RF signal strength value as inputs into a first trained model. The processing logic can predict that the wearable device is directed at the second wireless endpoint device, for example. The processing logic predicts a gesture made by the wearable device using the motion data as an input into a second trained model (block 1112). The processing logic sends a command corresponding to the gesture to the second wireless endpoint device via the radio (block 1114), and the method 1100 ends.

In a further embodiment, the processing logic processing logic discovers using a first protocol and discovers the second wireless endpoint device using a second protocol that is different than the first protocol. In another embodiment, the processing logic discovers the first and second wireless endpoint device using a same protocol.

In a further embodiment, the processing logic discovers first wireless endpoint device and the second wireless endpoint device using a multi-protocol stack. The multi-protocol stack can perform a scan on each channel of each wireless protocol of a plurality of wireless protocols. The multi-stack protocol can includes a protocol for each of the wireless technologies supported by the wearable device. The protocols can be specified in a device database, a user profile database, or both.

In a further embodiment, the processing logic receives, via a user interface device of the wearable device, user input that initiates a provisioning mode of the wearable device. The processing logic establishes, via the radio, a wireless connection (e.g., a secure wireless connection) with a wireless access point (WAP) device in the provisioning mode.

The wireless access point device can be a SmartHome WAP and the WAP device can be located in a proximity (e.g., within a specified distance) of the wearable device during the provisioning mode for security. The processing logic can download the first trained model, the second trained model, and a device database. The device database can include a set of device identifiers that represent devices registered to a user account and a controlling profile for each device of the devices registered to the user account. The wireless access point device can be previously associated with the user account. The user account can be associated with the wearable device. The device database can also specify the technology protocol used by each of the devices being provisioned. In another embodiment, a user profile database can be downloaded. The user profile database can include a set of user identifiers that represent users registered to the user account.

In another embodiment, the processing logic collects first sensor data from the motion tracking sensor and first proximity data i) while a user, carrying the wearable device, is located in a first position in a room and is pointing the wearable device towards the first wireless endpoint device and ii) while the user moves inside the room in a circle while continuing to point the wearable device towards the first wireless endpoint device. The processing logic can also collect second sensor data from the motion tracking sensor and second proximity data iii) while the user is located in the first position (or a second position in the room and iv) while the user moves inside the room in the circle while pointing the wearable device towards the second wireless endpoint device. The processing logic sends, the first sensor data, the first proximity data, the second sensor data, and the second proximity data to a remote server via the radio. The remote sensor can train the one or more models using this data. For example, the processing logic receives the first trained model and the second trained model from the remote server.

In another embodiment, the processing logic authenticates the first wireless endpoint device and the second wireless endpoint device against the devices registered to the user account in the device database.

In another embodiment, the processing logic downloads a policy database. The policy database can include a rule that only a device having a corresponding RSSI value that exceeds a RSSI threshold is allowed to control one of the devices registered to the user account, for example, the processing logic can store in a cache a set of device identifiers, each corresponding to a wireless endpoint device discovered during a discovery process. The processing logic can filter, using the rule, the set of device identifiers in the device database, or both, the set of device identifiers from the discovery process into a subset of device identifiers. The subset of device identifiers can include a first device identifier corresponding to the first wireless endpoint device and a second device identifier corresponding to the second wireless endpoint device.

In a further embodiment, the processing logic detects, during an idle mode of the wearable device before the discovering the first wireless endpoint device, an initial motion of the wearable device using the motion data from the motion tracking sensor. The processing logic transitions from the idle mode to a discovery mode. The processing logic initiates, during the discovery mode, a first discovery process with a first protocol to discover any wireless endpoint devices using the first protocol. The processing logic initiates, during the discovery mode and after the first discovery process, a second discovery process with a second protocol to discover any wireless endpoint devices using the second protocol.

In a further embodiment, the processing logic receives, by a multi-protocol stack of the processor, a first packet from a multi-mode PHY layer of the radio. The radio can be a single RF radio as described herein. The processing logic sends, by the multi-protocol stack, a second packet to the multi-mode PHY layer.

In a further embodiment, the processing logic sends the command to the second endpoint device by retrieving a controlling profile associated with the second wireless endpoint device in a device database. The processing logic can retrieve a network key associated with the second wireless endpoint device in a key store. The multi-protocol stack of the processing logic can format a packet with the command and can encode the packet using the network key.

In another embodiment, the processing logic can perform another method to predict which device the user is pointing at using a proximity change pattern. In one embodiment, the method begins by the processing logic discovering a first wireless endpoint device, a second wireless endpoint device, and a third wireless endpoint device via a radio of the wearable device. The processing logic measures motion data from a motion tracking sensor (e.g., 6-axis gyroscope and an accelerometer sensor) of the wearable device during movement of the wearable device in a pattern that is directed towards the first wireless endpoint device and directed away from the first wireless endpoint device. The processing logic measures first proximity data between the wearable device and the first wireless endpoint device at discrete points in time during the movement of the wearable device in the pattern. The processing logic measures second proximity data between the wearable device and the second wireless endpoint device at the same discrete points in time during the movement of the wearable device in the pattern. The processing logic measures third proximity data between the wearable device and the third wireless endpoint device at the same discrete points in time during the movement of the wearable device in the pattern. The processing logic predicts which of the first, second, or third wireless endpoint devices the wearable device is a target device using the first proximity data, the second proximity data, and the third proximity data. The target device is a device to which the wearable device is pointing during movement of the wearable device pointing. The processing logic sends a command to the target device via the radio.

In a further embodiment, the processing logic discovers the first wireless endpoint device using a first protocol and the second wireless endpoint device using a second protocol that is different than the first protocol. Alternatively, the processing logic discovers the first and second wireless endpoints using a same protocol. In another embodiment, the processing logic discovers the first wireless endpoint device, the second wireless endpoint device, and the third wireless endpoint device using a multi-protocol stack. The multi-protocol stack performs a scan on each channel of each wireless protocol of a plurality of wireless protocols.

In a further embodiment, the processing logic authenticates the first wireless endpoint device, the second wireless endpoint device, and the third wireless endpoint device against devices registered to a user account in a device database.

In another embodiment, the processing logic detects, during an idle mode of the wearable device before the discovering the first wireless endpoint device, an initial motion of the wearable device using the motion data from the motion tracking sensor. The processing logic transitions from the idle mode to a discovery mode. The processing logic initiates, during the discovery mode, a first discovery process with a first protocol to discover any wireless endpoint devices using the first protocol. The processing logic initiates, during the discovery mode and after the first discovery process, a second discovery process with a second protocol to discover any wireless endpoint devices using the second protocol. The first protocol is different than the second protocol.

In another embodiment, the processing logic receives, by a multi-protocol stack, a first packet from a multi-mode physical (PHY) layer of the radio (e.g., a single RF radio), and sends, by the multi-protocol stack, a second packet to the multi-mode PHY layer.

In a further embodiment, the processing logic sends the command by retrieving a controlling profile associated with the first wireless endpoint device in a device database, and retrieving a network key associated with the first wireless endpoint device in a key store. The processing logic formats, by a multi-protocol stack of the processor, a packet with the command. The processing logic can encode, by the multi-protocol stack, the packet using the network key.

Figure 12:
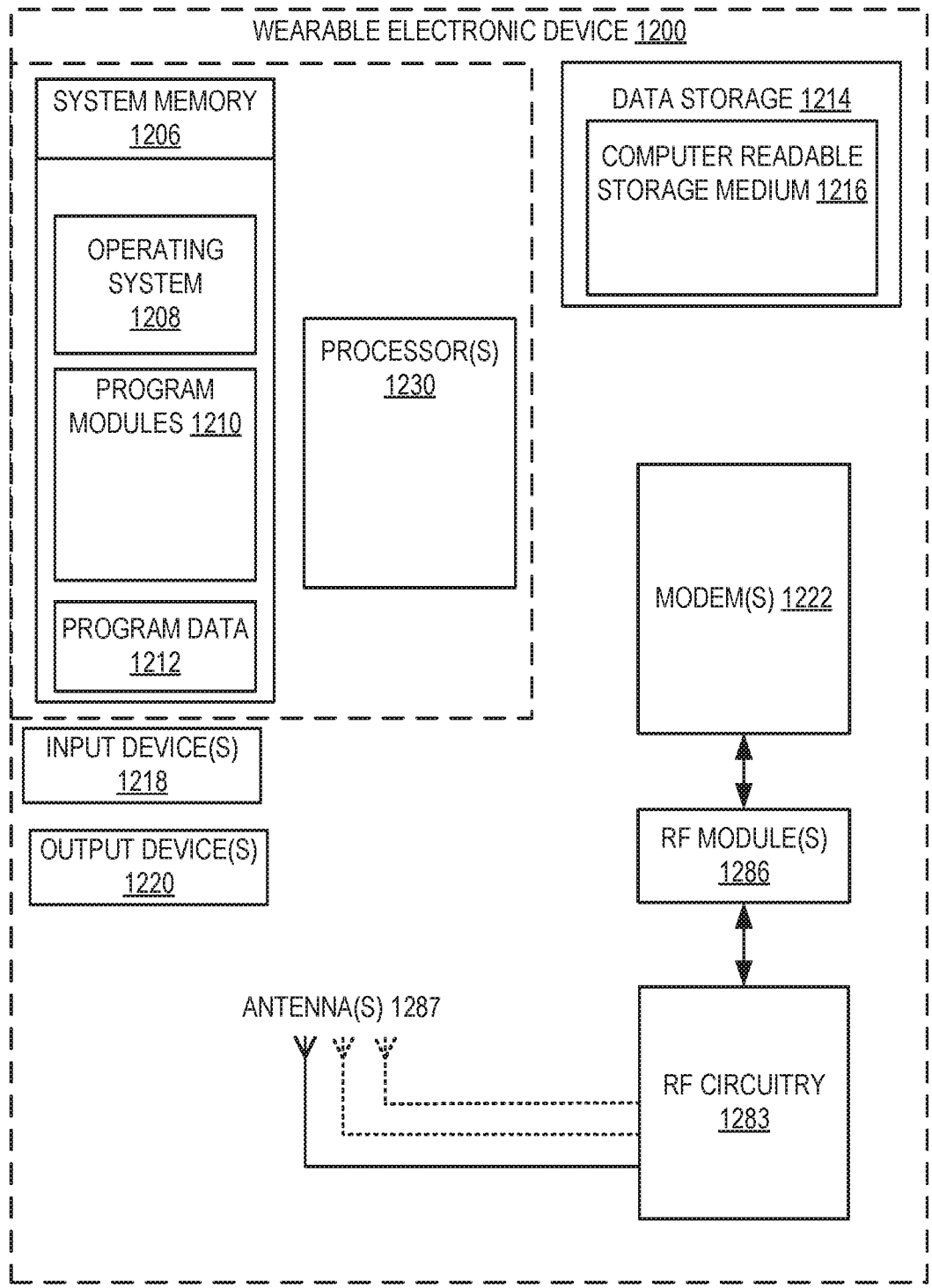
FIG. 12 is a block diagram of a wearable electronic device according to one embodiment.

FIG. 12 is a block diagram of a wearable electronic device 1200 according to one embodiment. The wearable electronic device 1200 may correspond to the wearable devices described above with respect to FIGS. 1-7. Alternatively, the wearable electronic device 1200 may be other electronic devices as described herein.

The wearable electronic device 1200 includes one or more processor(s) 1230, such as one or more CPUs, microcontrollers, field programmable gate arrays, or other types of processors. The wearable electronic device 1200 also includes system memory 1206, which may correspond to any combination of volatile and/or non-volatile storage mechanisms. The system memory 1206 stores information that provides operating system component 1208, various program modules 1210, program data 1212, and/or other components. In one embodiment, the system memory 1206 stores instructions of methods to control operation of the wearable electronic device 1200. The wearable electronic device 1200 performs functions by using the processor(s) 1230 to execute instructions provided by the system memory 1206.

The wearable electronic device 1200 also includes a data storage device 1214 that may be composed of one or more types of removable storage and/or one or more types of non-removable storage. The data storage device 1214 includes a computer-readable storage medium 1216 on which is stored one or more sets of instructions embodying any of the methodologies or functions described herein. Instructions for the program modules 1210 may reside, completely or at least partially, within the computer-readable storage medium 1216, system memory 1206 and/or within the processor(s) 1230 during execution thereof by the wearable electronic device 1200, the system memory 1206, and the processor(s) 1230 also constituting computer-readable media. The wearable electronic device 1200 may also include one or more input devices 1218 (keyboard, mouse device, specialized selection keys, etc.) and one or more output devices 1220 (displays, printers, audio output mechanisms, etc.).

The wearable electronic device 1200 further includes a modem 1222 to allow the wearable electronic device 1200 to communicate via a wireless connections (e.g., such as provided by the wireless communication system) with other computing devices, such as remote computers, an item providing system, and so forth. The modem 1222 can be connected to one or more RF modules 1286 that make up the two or more radios. The RF modules 1286 may be a WLAN module, a WAN module, PAN module, GPS module, or the like. The antenna structures (antenna(s) 1287) are coupled to the RF circuitry 1283, which is coupled to the modem 1222. The RF circuitry 1283 may include radio front-end circuitry, antenna switching circuitry, impedance matching circuitry, or the like. The antennas 1287 may be WLAN antennas (such as the surface-link antennas described herein, GPS antennas, NFC antennas, other WAN antennas, WLAN or PAN antennas, or the like. The modem 1222 allows the wearable electronic device 1200 to handle both voice and non-voice communications (such as communications for text messages, multimedia messages, media downloads, web browsing, etc.) with a wireless communication system. The modem 1222 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1222 may generate signals and send these signals to antenna(s) 1287 of a first type (e.g., WLAN 5 GHz), antenna(s) 1285 of a second type (e.g., WLAN 2.4 GHz), and/or antenna(s) 1287 of a third type (e.g., WAN), via RF circuitry 1283, and RF module(s) 1286 as descried herein. Antennas 1287 may be configured to transmit in different frequency bands and/or using different wireless communication protocols. The antennas 1287 may be directional, omnidirectional, or non-directional antennas. In addition to sending data, antennas 1287 may also receive data, which is sent to appropriate RF modules connected to the antennas. One of the antennas 1287 may be any combination of the antenna structures described herein.

In one embodiment, the wearable electronic device 1200 establishes a first connection using a first wireless communication protocol, and a second connection using a different wireless communication protocol. The first wireless connection and second wireless connection may be active concurrently, for example, if a wireless network device is receiving a media item from another wireless network device via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1222 is shown to control transmission and reception via antenna (1287), the wearable electronic device 1200 may alternatively include multiple modems, each of which is configured to transmit/receive data via a different antenna and/or wireless transmission protocol.

In the above description, the embodiments of the surface-link antennas and antenna architectures may be used in a wireless network containing multiple network devices, organized in a network topology (e.g., AP-STA, Mesh, and Hybrid). The network devices in the wireless network cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These wireless networks can be used in the interim before broadband Internet infrastructure becomes widely available in those developing nations. The wireless network devices are also referred to herein as mesh routers, mesh network devices, mesh nodes, Meshboxes, or Meshbox nodes, even when not used in mesh configurations. Multiple wireless network devices wirelessly are connected through a network backbone formed by multiple peer-to-peer (P2P) wireless connections (i.e., wireless connections between multiple pairs of the wireless network devices). The multiple network devices are wirelessly connected to one or more client consumption devices by node-to-client (N2C) wireless connections. The multiple network devices are wirelessly connected to a mesh network control service (MNCS) device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, voice-controlled devices, and the like.

The embodiments of the wireless network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wearable electronic device comprising:
a user interface device;
a single radio with a multi-mode physical (PHY) layer;
a motion tracking sensor comprising a multi-axis gyroscope and an accelerometer;
a processor coupled to the user interface device, the single radio, and the motion tracking sensor, wherein the processor:
receives, via the user interface device, a request that causes the processor to enter a first mode in which the processor establishes a secure wireless connection with a wireless access point device and downloads a first trained model for gesture recognition, a second trained model for target device predictions, and a device database, wherein the device database comprises a set of device identifiers that represent a plurality of devices registered to a user account and a controlling profile for each device of the plurality of devices;
discovers, in a second mode, a first wireless light bulb and a second wireless light bulb;
determines first angle data between the wearable electronic device and the first wireless light bulb and second angle data between the wearable electronic device and the second wireless light bulb;
determines, in the second mode, a first receive signal strength indicator (RSSI) value and a second RSSI value, wherein the first RSSI value is measured at the single radio and is indicative of a first distance between the wearable electronic device and the first wireless light bulb and the second RSSI value is measured at the single radio and is indicative of a second distance between the wearable electronic device and the second wireless light bulb;

determines, using the first trained model and acceleration data received from the motion tracking sensor, a first gesture performed by a user of the wearable electronic device, wherein the first gesture is associated with a command;

determines, using the second trained model, the second angle data, and the second RSSI value, that the first gesture was associated with the second wireless light bulb; and sends, to the second wireless light bulb, data associated with the command.

2. The wearable electronic device of claim 1, wherein the processor further:

before the data associated with the command is sent to the second wireless light bulb, verifies that the second wireless light bulb is among the devices registered to the user account in the device database; and before the data associated with the command is sent to the second wireless light bulb, verifies that the second RSSI value exceeds a RSSI threshold specified in a rule stored in a policy database.

3. The wearable electronic device of claim 1, wherein the processor further:

detects, during an idle mode of the wearable electronic device, a motion of the wearable electronic device using the acceleration data from the motion tracking sensor;

transitions from the idle mode to the second mode;

initiates, during the second mode, a first discovery process to discover any wireless light bulbs using a first protocol via the single radio; and initiates, during the second mode and after the first discovery process, a second discovery process to discover any wireless light bulbs using a second protocol via the single radio.

4. The wearable electronic device of claim 1, wherein the processor further:

before downloading the second trained model from the wireless access point device, determines first historical angle data between the wearable electronic device and the first wireless light bulb and second historical angle data between the wearable electronic device and the second wireless light bulb determines first historical RSSI values, each corresponding to a distance between the wearable electronic device and the first wireless light bulb, and second historical RSSI values, each corresponding to a distance between the wearable electronic device and the second wireless light bulb; and sends the first historical angle data, the first historical RSSI values, the second historical angle data, and the second historical RSSI values to a remote server; and receives the second trained model from the remote server.

5. A method comprising:

discovering, by a processor of a wearable electronic device, a first device and a second device via a radio of the wearable electronic device;

receiving, by the processor, sensor data from a motion sensor of the wearable electronic device, wherein the sensor data comprises (i) first angle data between the wearable electronic device and the first device, (ii) second angle data between the wearable electronic device and the second device and (iii) motion data indicative of motion of the wearable electronic device over a first duration of time;

determining, by the wearable electronic device, a first radio frequency (RF) signal strength value of a first wireless connection between the first device and the wearable electronic device;

determining, by the wearable electronic device a second RF signal strength value of a second wireless connection between the second device and the wearable electronic device;

determining, by the wearable electronic device, using the first angle data, the second angle data, the first RF signal strength value, and the second RF signal strength value, iv) a position of the wearable electronic device and v) that the position of the wearable electronic device indicates selection of the second device using a first trained model, wherein the first angle data, the second angle data, the first RF signal strength value, and the second RF signal strength value are inputs into the first trained model;

determining, by the wearable electronic device using sensor data, a gesture associated with the motion of the wearable electronic device; and sending, by the wearable electronic device, a message corresponding to the gesture to the second device.

6. The method of claim 5, further comprising:

receiving, by the wearable electronic device via a user interface device of the wearable electronic device, user input;

establishing, by the wearable electronic device in response to the user input, a wireless connection with a wireless access point device using the radio, wherein the wireless access point device is communicatively coupled to the first and the second devices; and receiving the first trained model, a second trained model, and a device database via the wireless access point device, wherein the device database comprises (vi) a first device identifier associated with the first device, (vii) a second device identifier associated with the second device and (viii) profile information for each of the first and the second devices and wherein the first and the second devices are associated with a user account.

7. The method of claim 6, further comprising:

before receiving the first trained model via the wireless access point device, determining first historical angle data between the wearable electronic device and the first device and second historical angle data between the wearable electronic device and the second device;

determining ix) first historical RSSI values, each corresponding to a distance between the wearable electronic device and the first device, and x) second historical RSSI values, each corresponding to a distance between the wearable electronic device and the second device; and sending the first historical angle data, the first historical RSSI values, the second historical angle data, and the second historical RSSI values to a remote server; and receiving the second trained model from the remote server.

8. The method of claim 6, further comprising:

sending, by the wearable electronic device, the sensor data, the first RF signal strength value, and the second RF signal strength value to a remote server via the radio; and receiving, by the wearable electronic device, the first trained model from the remote server.

9. The method of claim 6, further comprising:
verifying that the second device is among devices registered to the user account in the device database before the message is sent to the second device; and
verifying that the second RF signal strength value exceeds a threshold specified in a rule stored in a policy database before the message is sent to the second device.

10. The method of claim 5, further comprising:
detecting, by the wearable electronic device during an idle mode of the wearable electronic device before the discovering the first device, a motion of the wearable electronic device using the sensor data from the motion sensor;
transitioning, by the wearable electronic device, from the idle mode to a discovery mode;
initiating, by the wearable electronic device during the discovery mode, a first discovery process with a first protocol to discover any devices using the first protocol; and
initiating, by the wearable electronic device during the discovery mode and after the first discovery process, a second discovery process with a second protocol to discover any devices using the second protocol.

11. The method of claim 5, further comprising:
receiving, by a multi-protocol stack of the processor, a first packet from a multi-mode physical (PHY) layer of the radio, wherein the radio is a single radio; and
sending, by the multi-protocol stack, a second packet to the multi-mode PHY layer.

12. The method of claim 5, further comprising:
receiving, by the wearable electronic device via a wireless access point, a device database comprising (vi) a first device identifier associated with the first device, (vii) a second device identifier associated with the second device, (viii) a first link key and a first network key associated with the first device, and ix) a second link key and a second network key associated with the second device; and
generating, by the wearable electronic device, the message using the second link key and the second network key, wherein formatting the message comprises encrypting a command corresponding to the gesture with the second link key and the second network key.

13. The method of claim 5, wherein sending the message comprises:
retrieving, by the processor, a controlling profile associated with the second device in a device database;
retrieving, by the processor, an link key and a network key associated with the second device in a key store; and
generating, by a multi-protocol stack of the processor, the message using the network key and the link key.

14. A handheld electronic device comprising:
a radio;
a sensor; and
a processor coupled to the radio and the sensor, wherein the processor is to:
receive sensor data from the sensor, wherein the sensor data comprises (i) first angle data between the handheld electronic device and a first device, and (ii) second angle data between the handheld electronic device and a second device;
determine a first radio frequency (RF) signal strength value of a first wireless connection between the first device and the handheld electronic device;
determine a second RF signal strength value of a second wireless connection between the second device and the handheld electronic device;
determine, using the first angle data, the second angle data, the first RF signal strength value, and the second RF signal strength value, selection of the second device using a first trained model, wherein the first angle data, the second angle data, the first RF signal strength value, and the second RF signal strength value are inputs into the first trained model; and
send a message to the second device.

15. The handheld electronic device of claim 14, further comprising a user interface device coupled to the processor, wherein the processor is further to:
receive, via the user interface device, user input;
establish, in response to the user input, a wireless connection with a wireless access point device using the radio, wherein the wireless access point device is communicatively coupled to the first and the second devices; and
receive the first trained model, a second trained model, and a device database via the wireless access point device, wherein the device database comprises (iii) a first device identifier associated with the first device, (iv) a second device identifier associated with the second device and (v) profile information for each of the first and the second devices, and wherein the first and the second devices are associated with a user account.

16. The handheld electronic device of claim 15, wherein the processor, before receiving the first trained model via the wireless access point device, is further to:
determine first historical angle data between the handheld electronic device and the first device and second historical angle data between the handheld electronic device and the second device;
determine vi) first historical RSSI values, each corresponding to a distance between the handheld electronic device and the first device, and vii) second historical RSSI values, each corresponding to a distance between the handheld electronic device and the second device; and
send the first historical angle data, the first historical RSSI values, the second historical angle data, and the second historical RSSI values to a remote server; and
receive the second trained model from the remote server.

17. The handheld electronic device of claim 15, wherein the processor is further to:
send the sensor data, the first RF signal strength value, and the second RF signal strength value to a remote server via the radio; and
receive the first trained model from the remote server.

18. The handheld electronic device of claim 15, wherein the processor is further to:
verify that the second device is among devices registered to the user account in the device database before the message is sent to the second device; and
verify that the second RF signal strength value exceeds a threshold specified in a rule stored in a policy database before the message is sent to the second device.

19. The handheld electronic device of claim 14, wherein the processor is further to:
detect, during an idle mode of the handheld electronic device before discovering the first device, a motion of the handheld electronic device using the sensor data from the sensor;

initiate, during a discovery mode after the idle mode, a first discovery process with a first protocol to discover any devices using the first protocol; and initiate, during the discovery mode and after the first discovery process, a second discovery process with a second protocol to discover any devices using the second protocol.

\* \* \* \* \*